United States Patent

Komada et al.

[11] Patent Number: 5,917,610
[45] Date of Patent: *Jun. 29, 1999

[54] IMAGE FORMING APPARATUS

[75] Inventors: Yasuo Komada; Katsutoshi Ushida, both of Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/572,114

[22] Filed: Dec. 14, 1995

[30] Foreign Application Priority Data

Dec. 14, 1994 [JP] Japan .................................. 6-333183

[51] Int. Cl.[6] ................................................ H04N 1/00
[52] U.S. Cl. ............................ 358/400; 358/468; 358/498
[58] Field of Search .................................... 358/400, 401, 358/468, 498, 404

[56] References Cited

U.S. PATENT DOCUMENTS

| | | | |
|---|---|---|---|
| 5,046,166 | 9/1991 | Takayanagi | 358/300 |
| 5,177,620 | 1/1993 | Fukushima | 358/400 |
| 5,483,353 | 1/1996 | Kudou | 358/404 |
| 5,550,637 | 8/1996 | Murakami | 358/401 |

FOREIGN PATENT DOCUMENTS

| | | |
|---|---|---|
| A0145890 | 6/1985 | European Pat. Off. . |
| A0358441 | 3/1990 | European Pat. Off. . |
| A5681262 | 2/1993 | Switzerland . |

*Primary Examiner*—Thomas D. Lee
*Attorney, Agent, or Firm*—Fitzpatrick Cella Harper & Scinto

[57] ABSTRACT

An image forming apparatus is provided which is capable of immediately performing a recording operation in the case where the apparatus is restored to the operation state from the waiting state. The image forming apparatus has an MPU for performing switching between a normal operation mode, in which the apparatus is operated with normal electric power, and a low power consumption operation mode, in which the apparatus is operated with a low power consumption which is smaller than the normal electric power, so as to reduce electric power consumption. When the MPU switches the mode of the apparatus from the low power consumption operation mode to the normal operation mode, an initial-rotation inhibition signal for inhibiting initial rotation of a motor is generated. In response to the initial-rotation inhibition signal, the initial rotation of the motor is inhibited.

18 Claims, 29 Drawing Sheets

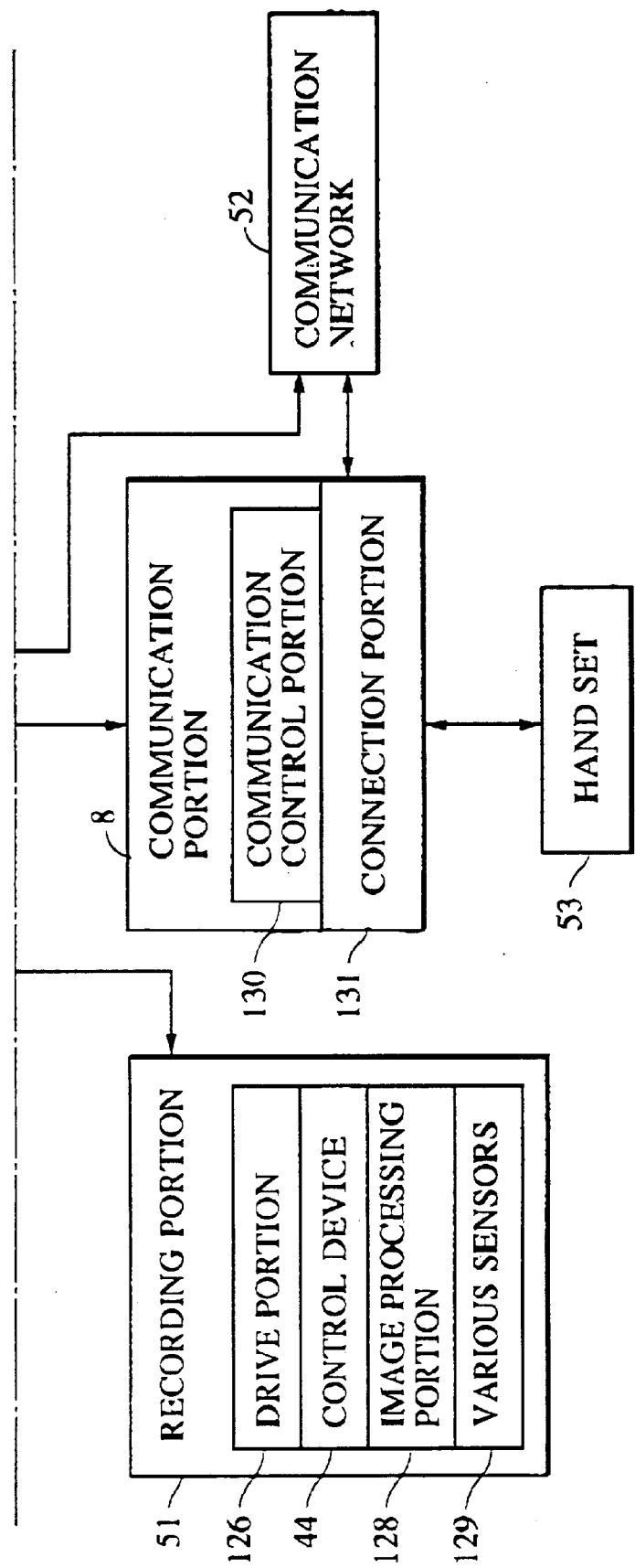

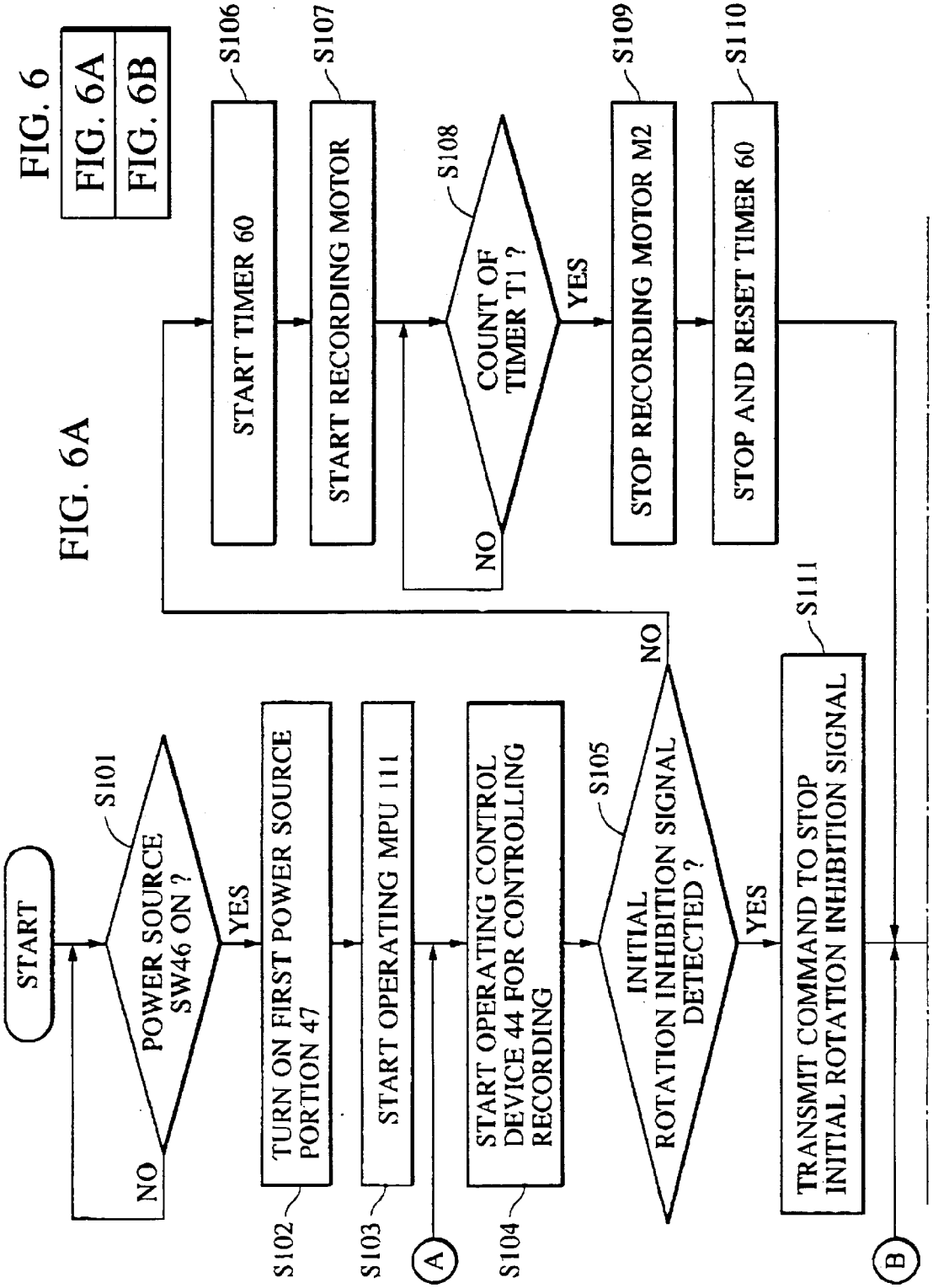

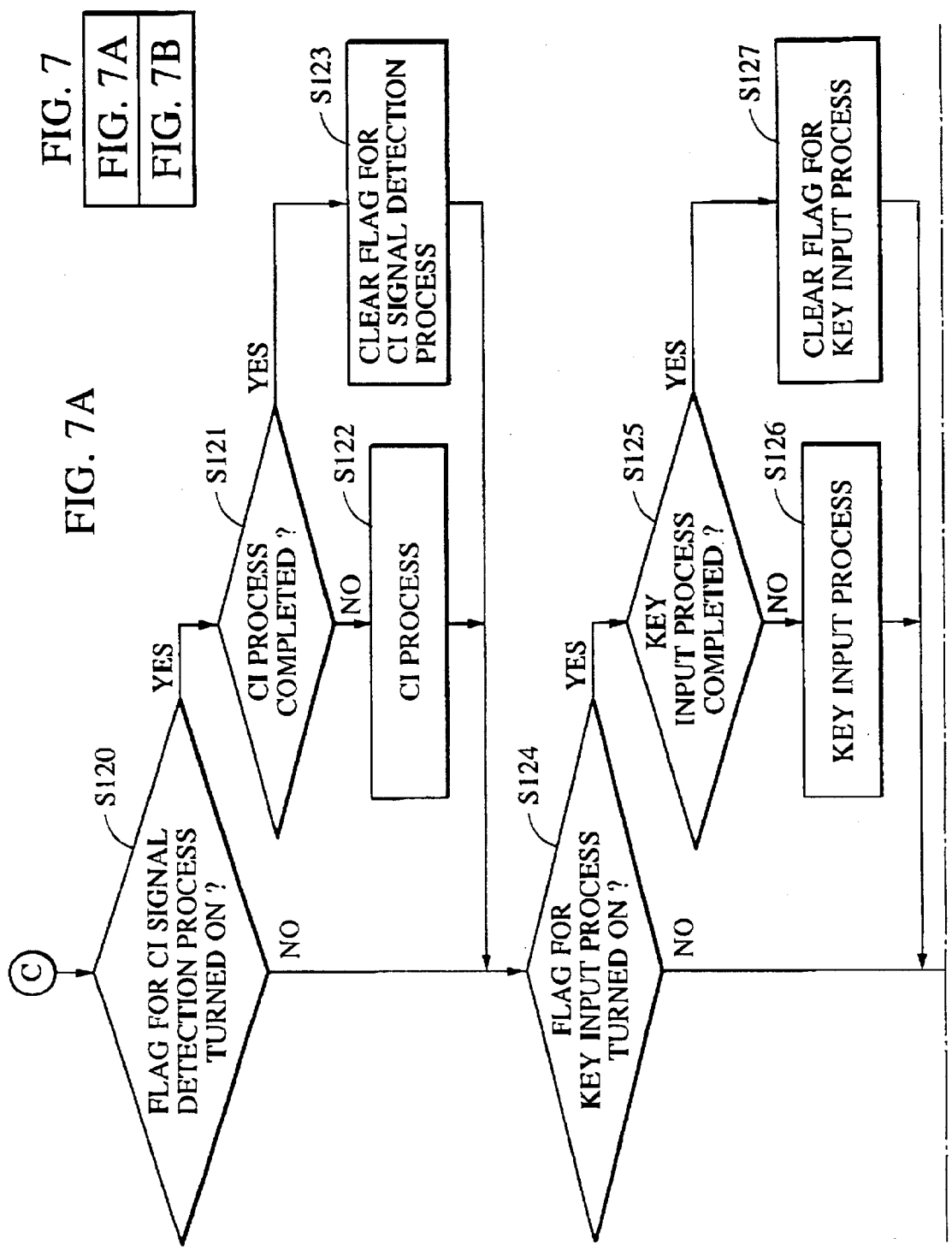

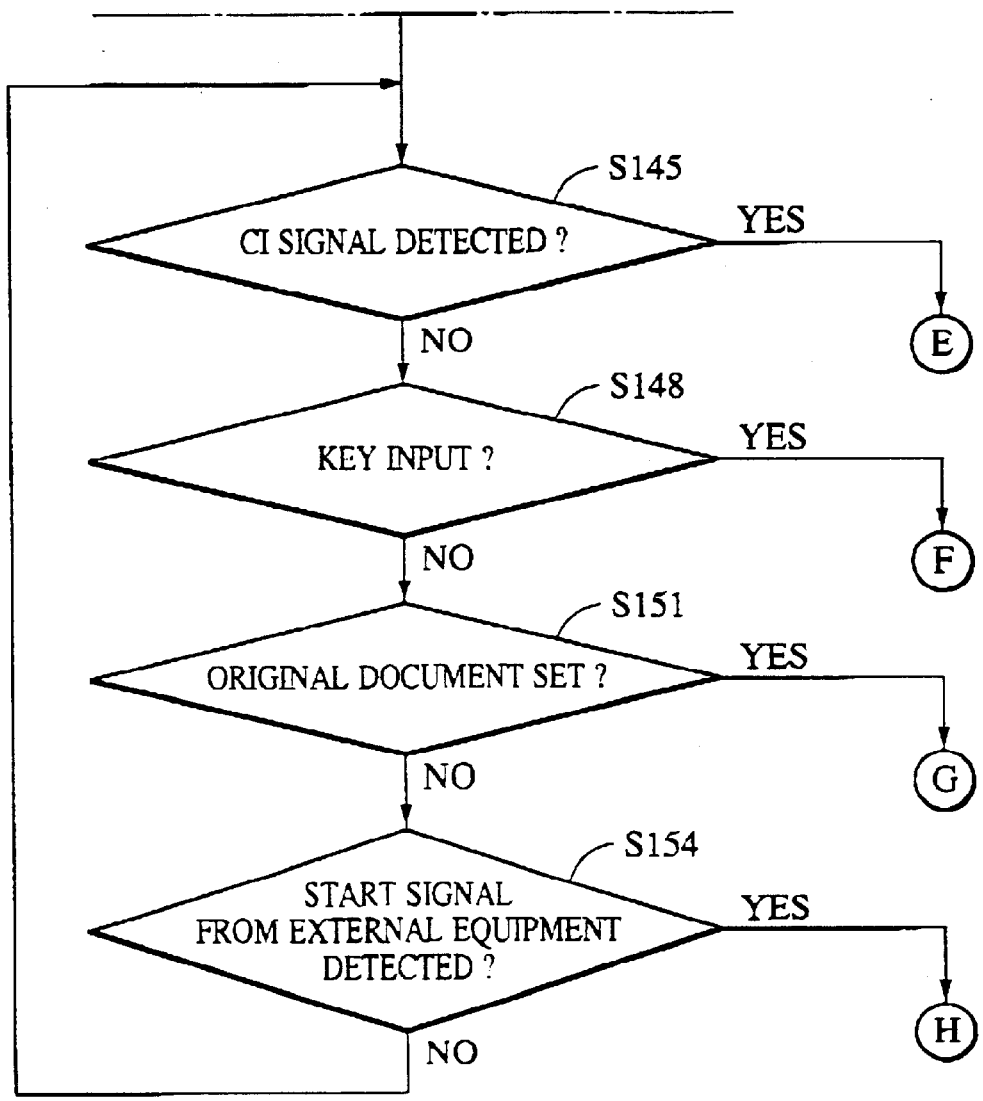

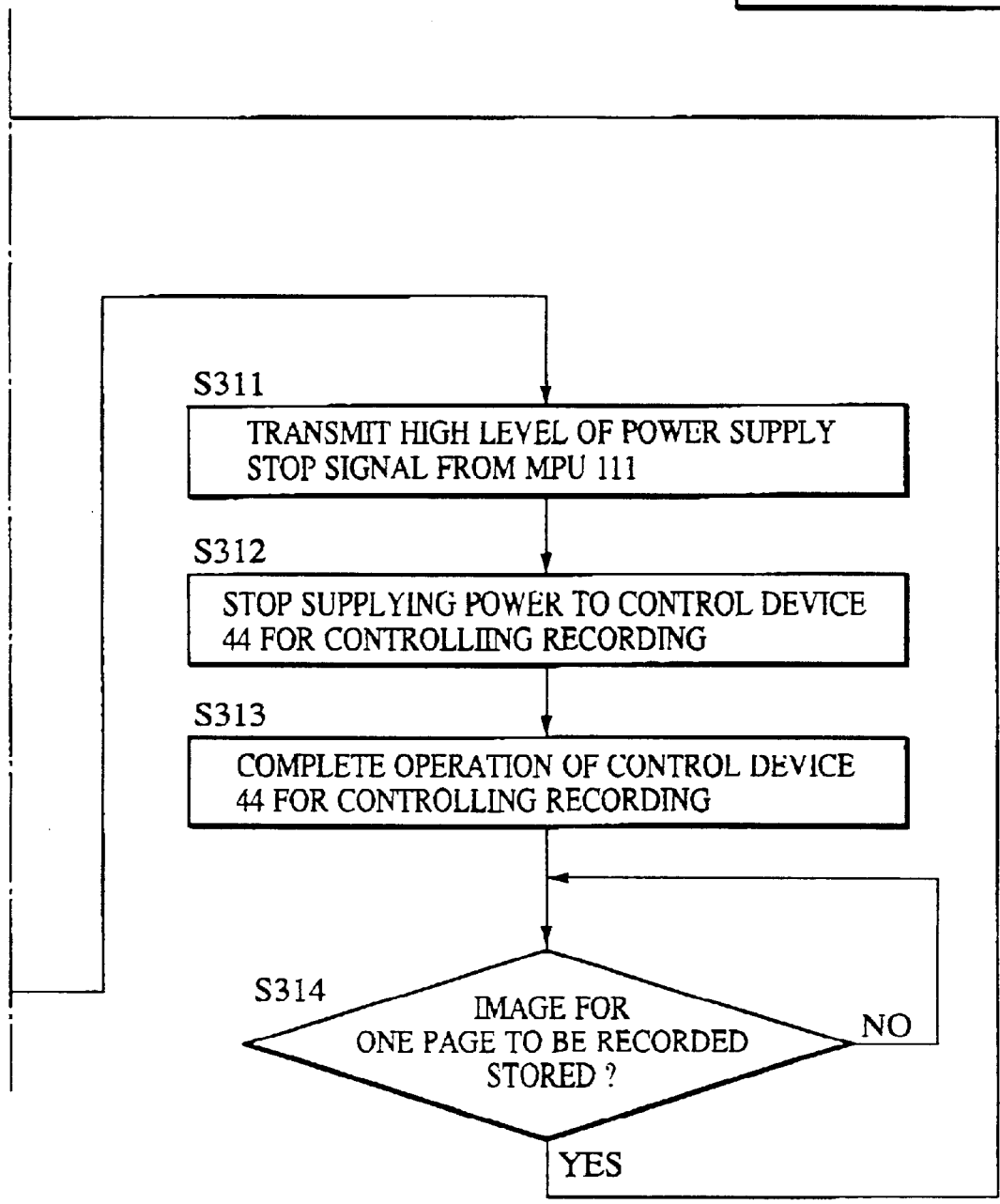

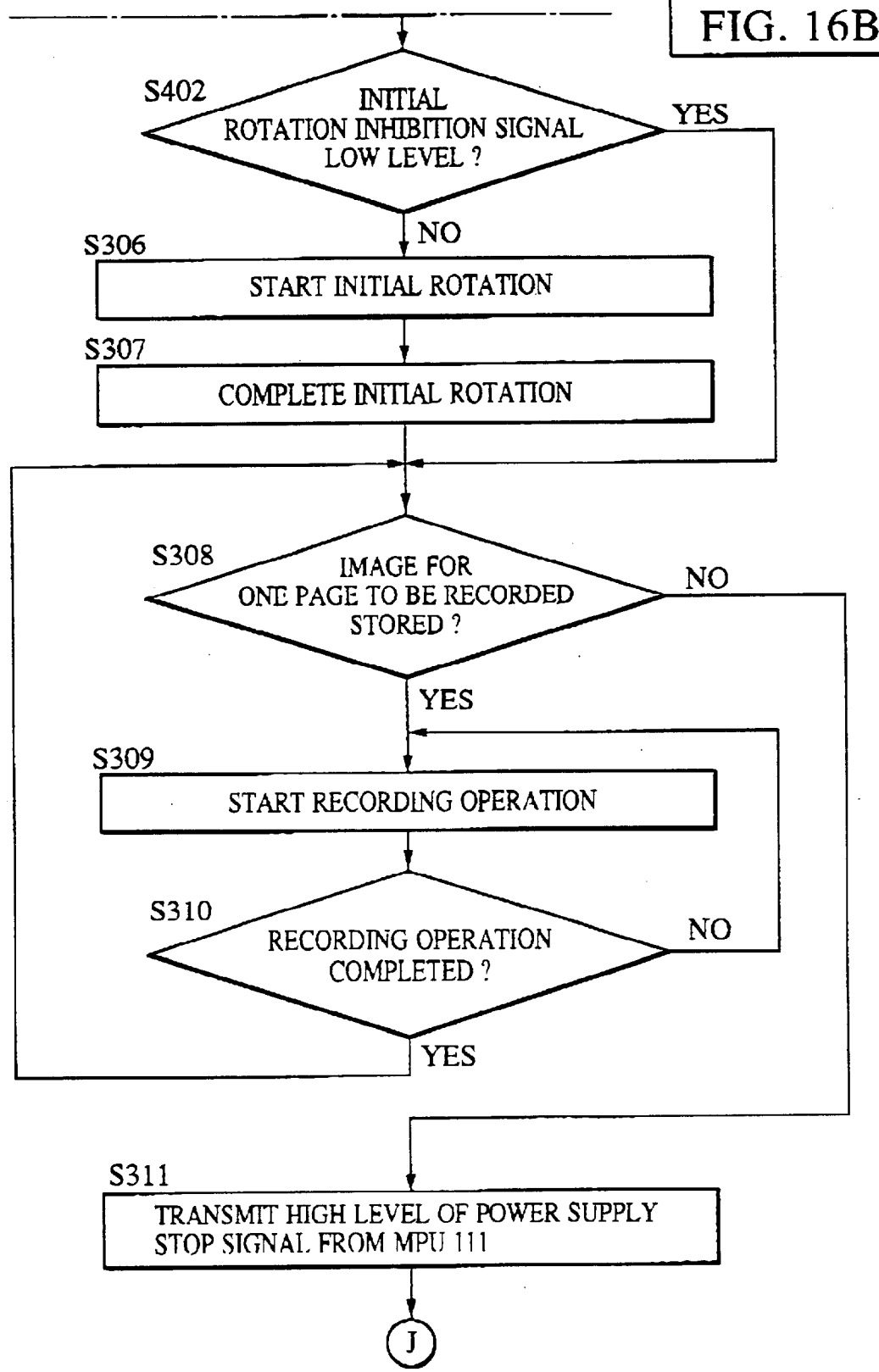

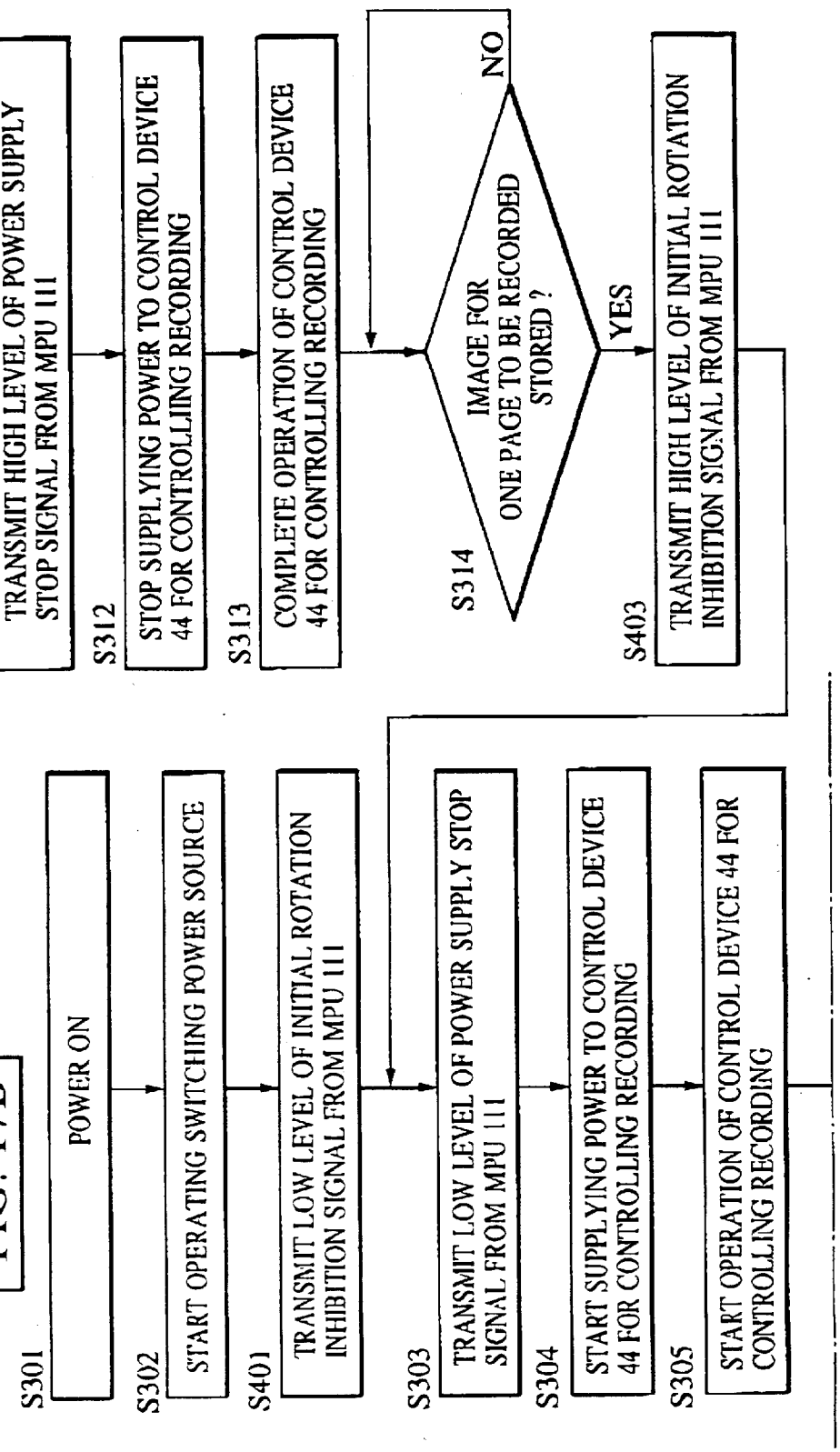

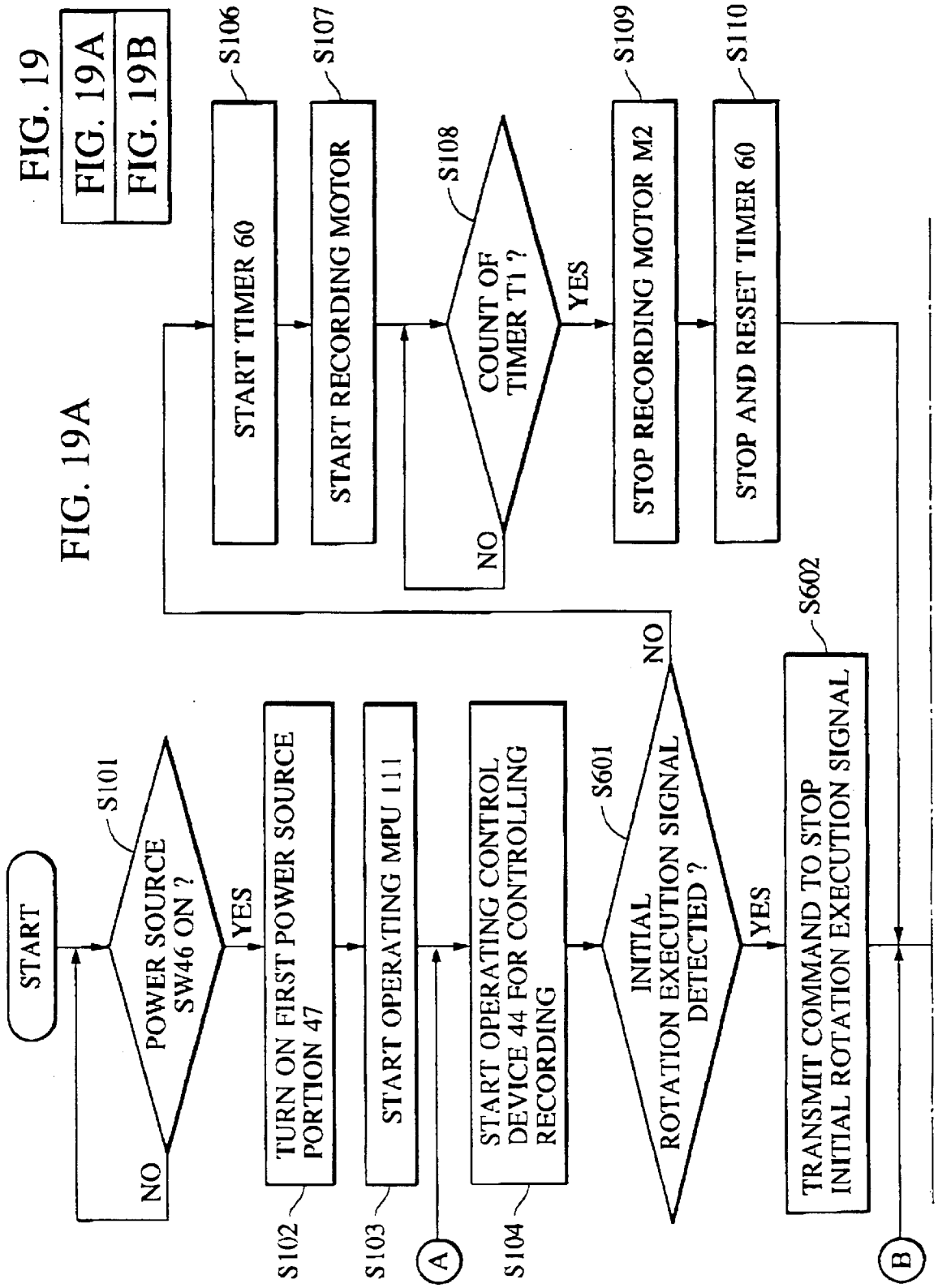

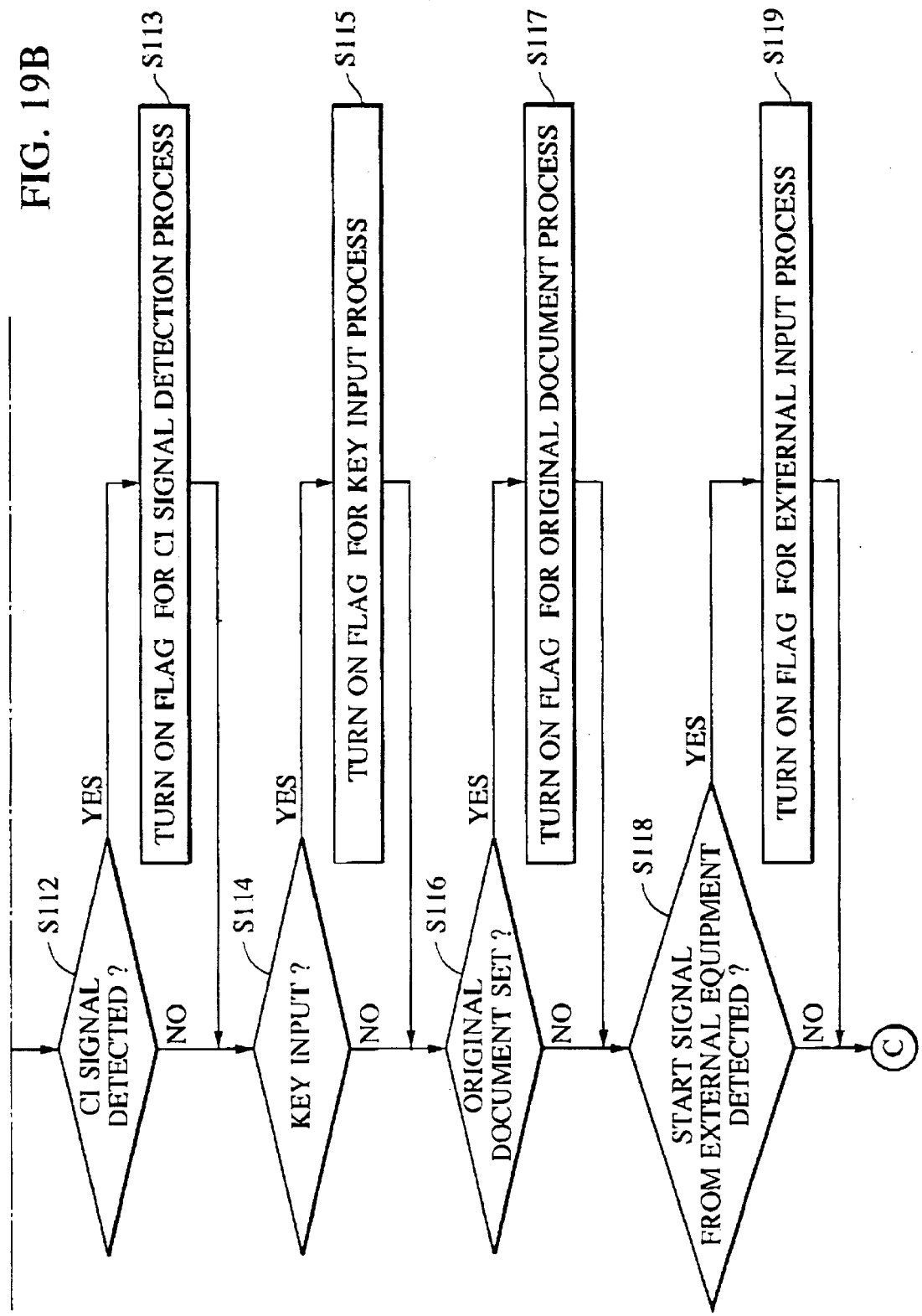

IMAGE FORMING APPARATUS

BACKGROUND OF THE INVENTION

1. Field of the Invention

The present invention relates to an image information apparatus, and more particularly to an image information apparatus adapted to an electrophotographic method.

2. Related Background Art

Hitherto, a facsimile apparatus including an image information apparatus of the foregoing type has been used to establish the connection and perform communication with another image forming apparatus or a communication apparatus connected through a communication line, record and read an image to be copied and make, to be common, communication means, recording means and reading means of the facsimile apparatus with respect to an external computer. In a state where the facsimile apparatus is not performing any of the foregoing operations, the facsimile apparatus is in a waiting state for performing the foregoing operation.

In the facsimile apparatus of the foregoing type, when power source switch means, which can be set by a user, is switched on, an output from a commercial AC power source or a spontaneously-generated AC power source is, regardless of the waiting state or the operating state, converted into a level of voltage (hereinafter called "stabilized output voltage") which is supplied to control devices in the apparatus through first power supply means. As described above, the stabilized output voltage is supplied to all control devices in the conventional facsimile apparatus.

Accordingly, electric power has been consumed similar to that consumed in the normal operating state though the facsimile apparatus is in a waiting state in which the normal kinetic operation is not performed. One of various methods of preventing consumption of electric power in the waiting state is to interrupt the operation for converting the supplied voltage to the stabilized output voltage during the waiting mode; and simultaneously, the power source for one (hereinafter called a waiting-operation control device) of the control devices is switched to a secondary power source, such as a secondary battery, to interrupt power supply to the other control devices. The foregoing operation for preventing consumption of electric power is hereinafter called a "low power consumption operation mode", while the operation for supplying electric power during the normal operation is called a "normal operation mode".

The first power supply means, which is the power source for each control device, interrupts supply of electric power to each control device when the normal operation mode has been shifted to the low power consumption operation mode. As an alternative to this, the power source is switched to the second power supply means, and then the second power supply means operates only the waiting-operation control device which is operated during the waiting mode. When a signal for restoring to the normal operation mode is supplied in the low power consumption operation mode, restoration from the low power consumption operation mode to the normal operation mode is performed.

In the low power consumption operation mode, the output terminal of the control device is latched to the same logic as that used immediately before the low power consumption operation mode is realized. Moreover, input of a clock signal for operating the control device is interrupted. As a result, a state can be realized in which only a signal for restoring the normal operation mode is received in a state where electric power consumption is minimized. The foregoing restoration signal is generated due to detection of a CI signal through a communication line, detection of off-hook of a handset, detection of a signal indicating whether or not an original document, to be read, exists, a start command issued by an external computer through an external interface and key input from the operation portion.

Simultaneously with the restoration to the normal operation, the operation for converting the voltage to the stabilized output voltage is restarted so that the power source for the waiting-operation control device is switched from the second power supply means to the stabilized output voltage supplied from the first power supply means.

By performing the foregoing method, electric power consumption can significantly be reduced during the waiting mode.

In the image forming apparatus of the facsimile apparatus of the foregoing type, the device (hereinafter called a "control device for controlling the recording operation") for controlling the recording operation reads the contents of a ROM (Read Only Memory), on which various instructions for the recording operation have been written, to operate a program routine for use when electric power is supplied. The foregoing operation is performed such that jam detection and checking of a state of an opening/closing cover of the apparatus are initially performed. If the results of the detection and checking are normal, a motor for conveying a transference member is rotated so that the motor performs initial rotation. As a result, initialization of an electrophotographic process portion, detection of a failure of a fixing unit by detecting the temperature realized when electric power is supplied to the fixing unit for a short time and detection of existence of toner are performed. To complete the foregoing operations, at least the time is required to rotate once the photosensitive drum in the electrophotographic process portion.

As described above, in the case where the conversion to the stabilized output voltage by the first power supply means is interrupted in the conventional image forming apparatus, electric power is not supplied to the control devices except the waiting-operation control device for preventing consumption of the second power supply means. As a matter of course, electric power has not been supplied to the device for controlling the recording operation. Therefore, even if the control device for controlling the recording operation has been brought to an operating state, determination cannot be performed whether the operating state is due to the shift from the waiting state or due to the activation (the power supply) of the apparatus. Thus, a program routine has been executed to perform the initial rotation similar to the case where power is supplied whenever the operating state is realized.

Accordingly, if restoration to the operating state is performed from the waiting state, the recording operation cannot immediately be performed. For example, if a facsimile receipt to be completed in a short time is performed, the recording operation cannot be performed because the initial rotation is being performed. Thus, there arises a problem in that a memory substitution receipt function is used because a determination is performed that the recording operation cannot be performed though no failure takes place.

In the case where the conventional image forming apparatus is used as an output apparatus of an external unit, if activation from an external unit is commanded, data cannot be received because preparation for performing the printing operation has not been completed. Thus, error occurrence is communicated with the external unit.

SUMMARY OF THE INVENTION

In view of the foregoing, an object of the present invention is to provide an image forming apparatus which is capable of immediately performing a recording operation in the case where the apparatus is restored from a waiting state to an operating state.

Another object of the present invention is to provide an image forming apparatus which is capable of preventing a wasteful operation, such that initial rotation is performed in a state where the recording operation cannot be performed.

Other objects, features and advantages of the invention will be evident from the following detailed description of the preferred embodiments described in conjunction with the attached drawings.

BRIEF DESCRIPTION OF DRAWINGS

FIGS. 4A and 4B are block diagrams showing a control system of the facsimile apparatus shown in FIG. 1;

FIGS. 6A and 6B are flow charts of the operation of the facsimile apparatus shown in FIG. 1;

FIGS. 7A and 7B are flow charts of the operation of the facsimile apparatus shown in FIG. 1;

FIGS. 8A and 8B are flow charts of the operation of the facsimile apparatus shown in FIG. 1;

FIGS. 15A and 15B are flow charts of the operation of the third embodiment;

FIGS. 16A and 16B are flow charts of the operation of a fourth embodiment;

FIGS. 17A and 17B are flow charts of the operation of a fifth embodiment;

FIGS. 19A and 19B are flow charts of the operation of the sixth embodiment;

DETAILED DESCRIPTION OF THE PREFERRED EMBODIMENTS

A preferred embodiment of a facsimile apparatus using an image information apparatus according to the present invention will now be described.

First Embodiment

Figure 1:
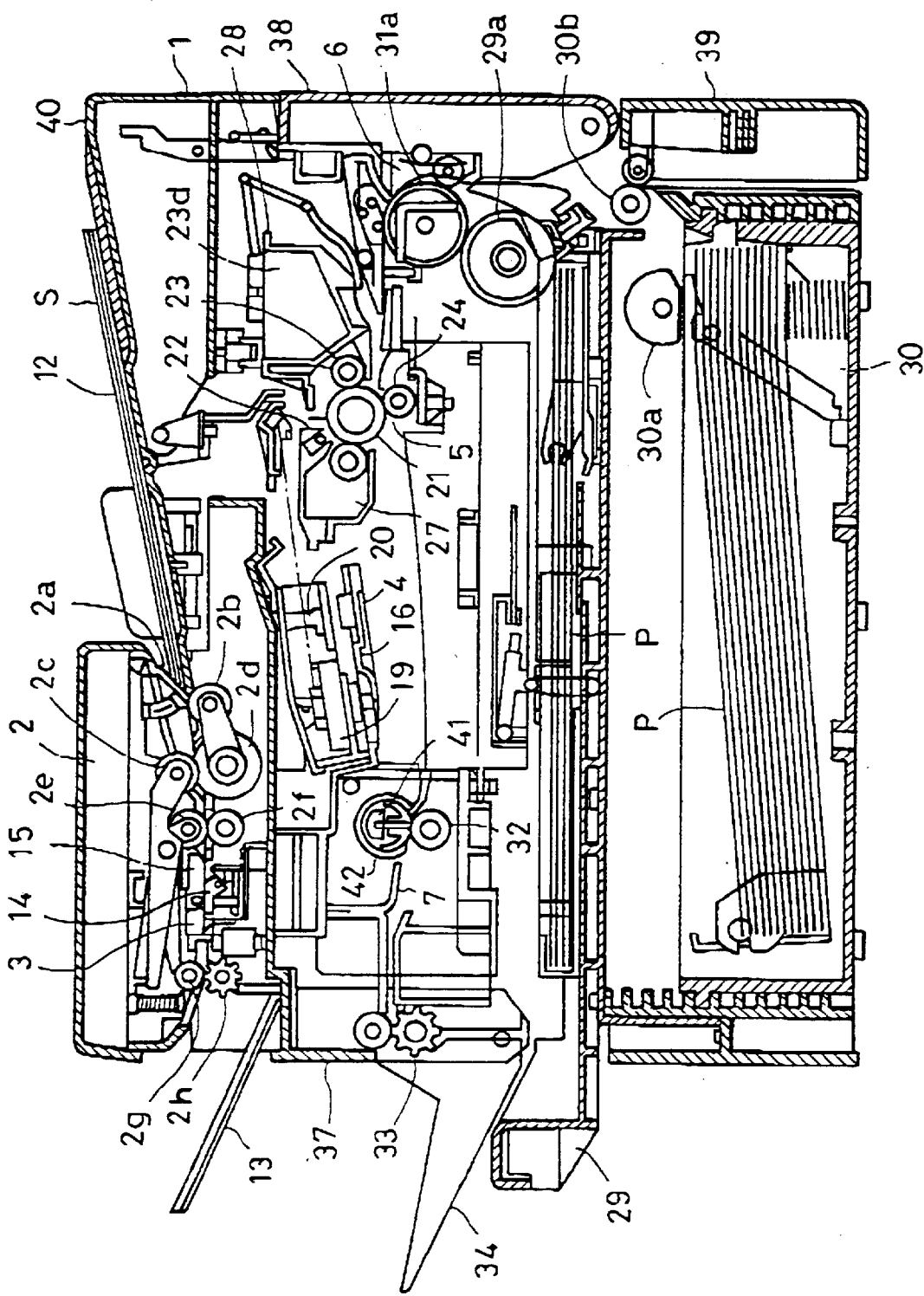
FIG. 1 is a side cross-sectional view of the internal structure of a facsimile apparatus according to an embodiment of the present invention.
Figure 2:
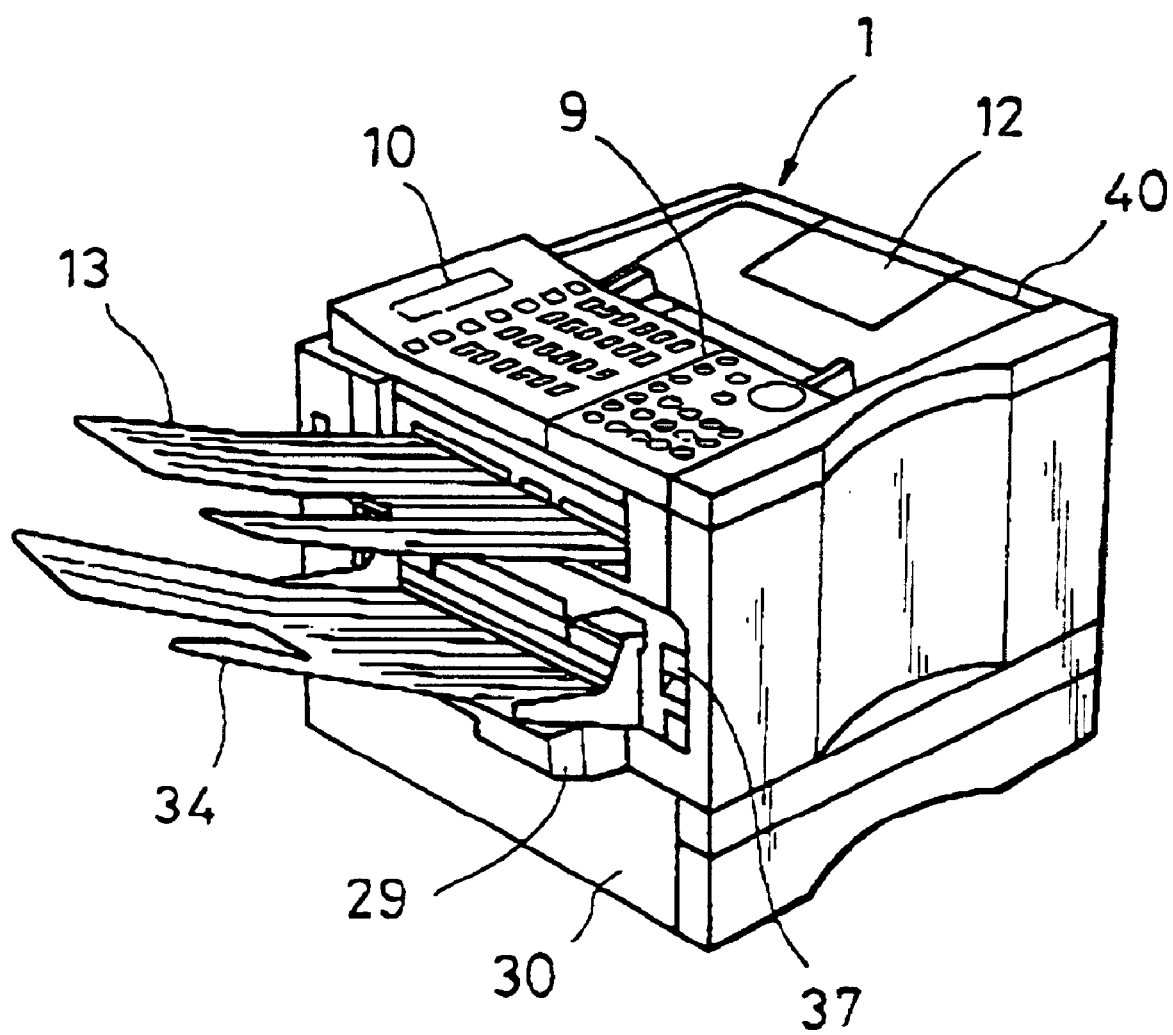
FIG. 2 is a schematic perspective view of the facsimile apparatus shown in FIG. 1.
Figure 3:
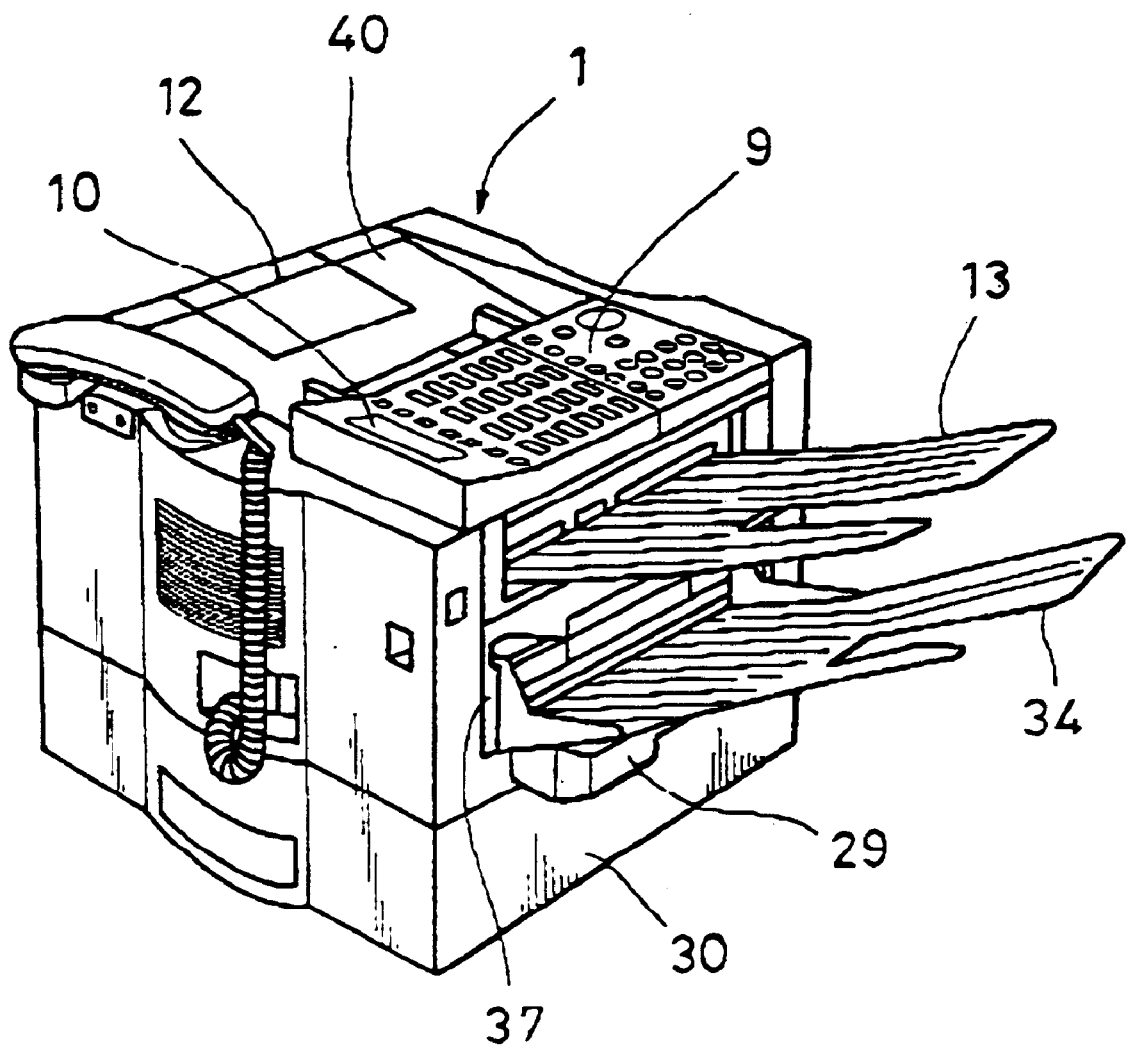
FIG. 3 is a schematic perspective view of the facsimile apparatus shown in FIG. 1.

FIG. 1 is a side cross-sectional view showing the internal structure of a facsimile apparatus according to an embodiment of the present invention. FIGS. 2 and 3 are schematic views of the facsimile apparatus shown in FIG. 1. Referring to FIGS. 1, 2 and 3, reference numeral 1 represents a body of the facsimile apparatus. The apparatus body 1 includes an original-document conveying portion 2, a reading portion 3, an optical portion 4, an image forming portion 5, a transference-member conveying portion 6, an image fixing portion 7, a communication portion 8 (not shown), and operation portion 9, a display portion 10 and a control portion 11 (not shown).

The original-document conveying portion 2 includes a sub-conveying roller 2b, pressed against a sub-conveying pressuring member 2a, and a separation roller 2d, pressed against a separation pressing member 2c, to separate sequentially a plurality of original-document sheets S stacked on an original-document retaining frame 12. Then, a paper-supply roller 2f pressed against a paper-supply roller 2e is rotated to convey the separated original-document sheet S to the reading portion 3.

The reading portion 3 consists of a contact-type image sensor (CS) 14, an original-document retaining plate 15 and the like. The contact-type image sensor 14 causes an LED (Light emitting Diode) array serving as a light source to emit light to the surface of the original-document sheet S, on which information is formed. Light reflected from the surface of the original-document sheet S is imaged on a sensor device by a SELFOC lens so that image information is read. The image information read by the sensor device is transmitted to the control portion 11 so that the image information is subjected to shading correction, A/D (analog/digital) conversion and the like. Then, the digitized image signal is supplied to the optical portion 4 or the communication portion 8 so as to be used in a recording process, to be performed by the apparatus according to the present invention, or image communication.

In the optical portion 4, a laser diode 17 (not shown) of a laser scanner 16 emits light in accordance with the image signal supplied from the control portion 11 so that modulated laser beams are generated. The modulated laser beams are, by the collimator lens 18 (not shown), converted into parallel beams and then made incident upon a polygonal mirror 19 which is rotated at a predetermined speed. The laser beams reflected by the polygonal mirror 19 are focused on the surface of the photosensitive drum 21 by an imaging lens 20 disposed in front of the polygonal mirror 19.

When the polygonal mirror 19 is rotated at a predetermined speed, the laser beams irradiating the surface of the photosensitive drum 21 scan the surface of the photosensitive drum 21 at a predetermined speed. When the photosensitive drum 21 is rotated at a predetermined speed and the laser beams scan the surface of the photosensitive drum 21 at a predetermined speed, a static latent image is formed on the surface of the photosensitive drum 21.

In the image forming portion 5, around the photosensitive drum 21 consisting of a conductive drum and a photoelectric layer, there are disposed a primary charger 22, a developing unit 23, a transferring charger 24, a blade type cleaning unit 25 (not shown) and an electric-power remover 26 (not shown). The photosensitive drum 21, the primary charger 22, the developing unit 23, the cleaning unit 25 and the electric-power remover 26 are, together with a developer restoring container 27, integrally accommodated in a process cartridge 28 (not shown) which is detachably attached into an attachment member of the apparatus body.

The photosensitive drum 21, the primary charger 22 and a development sleeve 23, which is disposed in the developing unit 23, and a transferring charger 24 are driven by a motor M2. The surface of the rotated photosensitive drum 21 in uniformly, negatively and directly charged due to passing of the primary charger 22. Then, the photosensitive drum 21 is irradiated with and exposed to laser beams emitted by the laser diode 17. Due to the irradiation with the laser beams, negative charges in a bright portion are neutralized so that the static latent image is formed. When the static latent image approaches developer T in the developing unit 23, the negatively charged developer T jumps onto the surface of the photosensitive drum 21 due to the difference between the potential of the static latent image and that of the developing unit 23. Thus, the static latent image is formed into a visible image. When the visible image is positively charged by the transferring charger 24, a toner image on the photosensitive drum 21 is transferred to the surface of transference member P.

Residual toner on the surface of the photosensitive drum 21, from which the toner image has been transferred, is removed by the cleaning unit 25. Then, the primary charger 22 uniforms the potential on the surface of the photosensitive drum 21 to prepare for the following operation for forming a static latent image. The residual toner removed from the surface of the photosensitive drum 21 is recovered by the developer restoring container 27. In the transference-member conveying portion 6, a first cassette 29 and a second cassette 30 are mounted on predetermined positions in the apparatus body 1 so as to be drawn. The transference members P accommodated in the first and second cassettes 29 and 30 can selectively be conveyed.

In the case where the transference members P accommodated in the first cassette 29 are conveyed, a paper supply solenoid SL1 (not shown) is operated so that the rotations of the motor M2 (not shown) are transmitted to a semicircular paper-supply roller 29a, thus causing the transference members P to be sequentially separated. The separated transference member P is conveyed by a conveyance roller 31a. At this time, a resist sensor 31b (not shown) detects the leading end of the transference member P, which is being conveyed, to make the conveyance timing to be appropriate so that the leading end of the toner image formed on the photosensitive drum 21 and that of the transference member P coincide with each other. Thus, the transference member P is allowed to pass between the photosensitive drum 21 and the transferring charger 24 by the conveyance roller 31a.

In the case where the transference members P accommodated in the second cassette 30 are conveyed, a paper supply solenoid SL2 (not shown) is operated so that the rotations of the motor M2 are transmitted to the semicircular paper-supply roller 30a. The rotations of the paper-supply roller 30a cause the transference members P to be sequentially separated so as to be conveyed from the second cassette 30 to the conveyance roller 31a by the conveyance roller 30b. Then, the transference member P is conveyed by the conveyance roller 31a. At this time, the leading end of the transference member P, which is being conveyed, is detected by the resist sensor 31b. By making the conveyance timing to be appropriate in such a manner that the leading end of the toner image formed on the photosensitive drum 21 coincides with that of the transference member P, the transference member P is allowed to pass between the photosensitive drum 21 and the transferring charger 24 by the conveyance roller 31a.

In the image forming portion 5, the transference member P, to which an image has been transferred, is further conveyed by a fixing roller 32 and a paper-discharge roller 33, which are rotated by the motor M2, and then discharged onto a transference member discharge tray 34. A paper-supply portion for performing the paper supply process and a paper discharge portion for performing the paper discharge process are provided with a paper-supply sensor 35 and a paper-discharge sensor 36, respectively. Thus, reach and passage of the transference member P can be detected. If the transference member P does not reach or pass through each of the paper-supply sensor 35 (not shown) and the paper-discharge sensor 36 (not shown), a determination is made that a defect has taken place during the conveyance of the transference member P and occurrence of a defect is displayed on the display portion.

The apparatus body 1 has a first opening/closing cover 37, a second opening/closing cover 38, a third opening/closing cover 39 and an upper cover 40, each of which is attached thereto so as to be opened and closed, as the need arises. The first opening/closing cover 37 is used to remove clogged transference member P in the paper discharge portion, the second opening/closing cover 38 and third opening/closing cover 39 are used to remove clogged transference member P in the paper-supply portion, and the upper cover 40 is used to remove clogged transference member P in the process cartridge 28 and to mount/remove the process cartridge 28.

The image fixing portion 7 consists of a heater 41, a fixing film 42, the fixing roller 32 and the paper-discharge roller 33. The heater 41 detects the temperature of the surface of a thermistor 43 in accordance with change in the resistance of the thermistor 43 positioned in contact with the heater 41 so that the temperature of the surface is made to be constant. The surface of the heater 41 heats the fixing film 42. Since the heater 41 has a small heat capacity, the heater 41 can be heated to a predetermined level before the transference member P reaches the fixing unit.

When the transference member P, to which the toner image has been transferred and which has been separated and conveyed from the photosensitive drum 21, is, in the image forming portion 5, moved into a fixation nipping portion consisting of the heater 41 and the fixing roller 32, the fixing roller 32 presses the toner on the transference member P against the heater 41 through the fixing film 42. Heat conducted from the heater 41 softens and melts the toner so that the toner is fixed to the transference member P. The transference member P having the toner image fixed thereto is discharged onto the upper surface of the transference member discharge tray 34.

The communication portion 8 is able to establish the connection between a multiplicity of communication apparatuses, such as communication lines and/or telephone sets, and the apparatus body 1. The communication portion 8 modulates and demodulates image data to be communicated, detects significant signals and switches the connection of the signal passage.

The operation portion 9 consists of a plurality of key-input switches, a circuit for detecting the key input and the like to input an instruction to operate the apparatus and a variety of information items. The display portion 10 displays a state of the apparatus, the telephone number to which a call is made, time information and a subject operation procedure. The control portion 11 controls the foregoing sections and mechanisms.

Figure 4A:
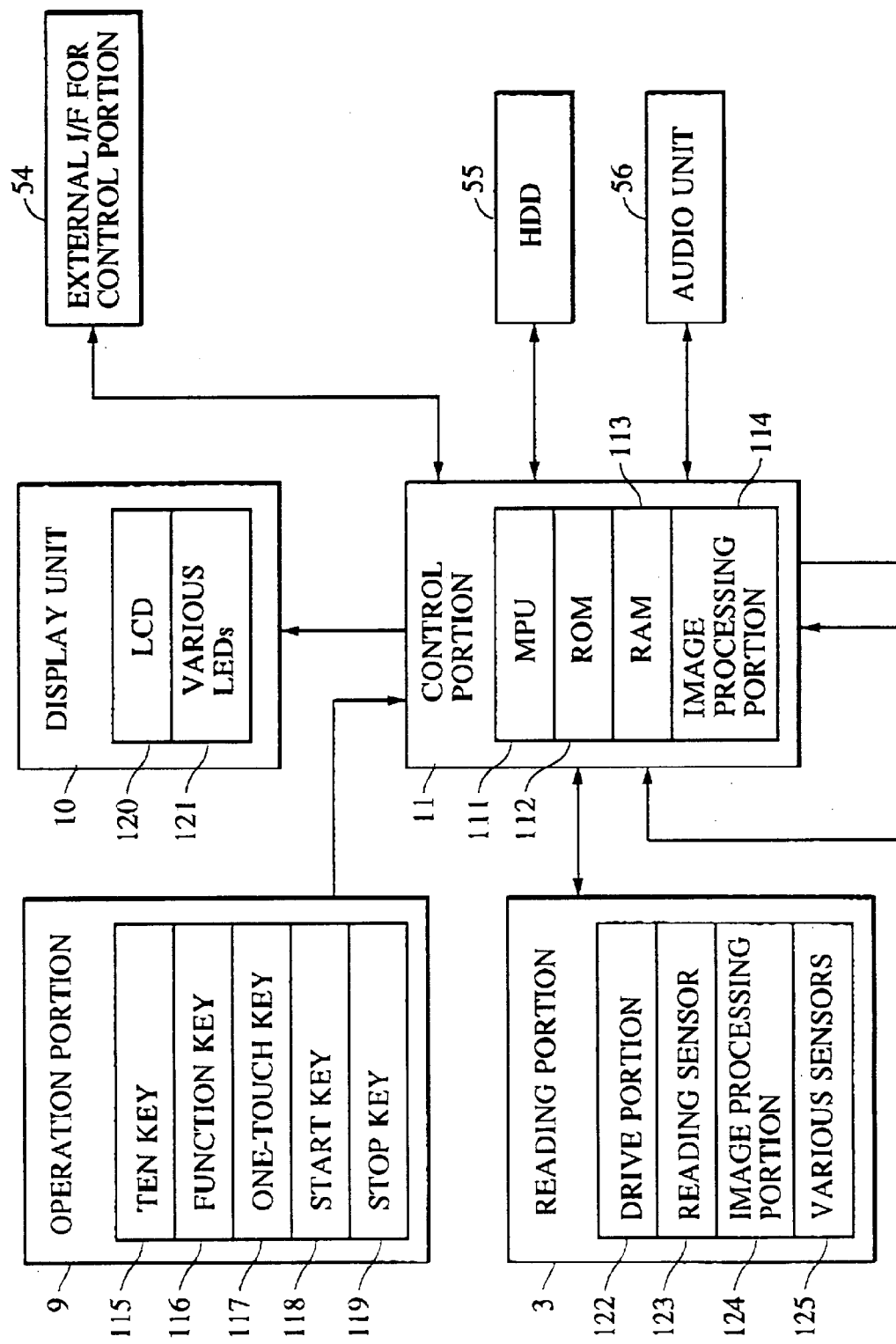

FIG. 4 is a block diagram showing a control system of the facsimile apparatus shown in FIG. 1. Referring to FIG. 4, the control portion 11 comprises a CPU (Central Processing Unit) for controlling the total operations of the facsimile apparatus. The control portion 11 includes an MPU (Microprocessor Unit) 111 and a ROM 112 for storing instruction groups as a program, each of the instruction groups having descriptions of the operation of the MPU 111. The control portion 11 further includes a RAM 113 for use as a work area for performing any of a variety of data processes and a portion for temporarily storing image information, and an image processing portion 114 for changing the magnification of the image, the resolution and the like.

The control portion 11 has functions to serve as a calendar and a clock, while the RAM 113 is backed up by a battery or the like so as to be protected from an accidental problem such as a power failure or the like.

The control system of the facsimile apparatus according to this embodiment has a structure formed by combining the control portion 11 and the sections shown in FIG. 4 by an interface.

The operation portion 9 includes a variety of key switches, such as a ten-key pad 115, a function key 116, a one-touch key 117, a start key 118 and a stop key 119.

The display portion 10 consists of an LCD (Liquid Crystal Display) 120 for displaying a variety of messages and a various LEDs 121 for displaying a transmission mode and the like. The reading portion 3 consists of a drive portion 122 including a reading motor and the like, a reading sensor 123 for reading an image, an image processing portion 124 for subjecting the read image to shading correction and binary coding, various sensors 125 for detecting original document, and the like.

The recording portion 51 consists of a drive portion 126 for rotating the recording motor or the like, a control device (a control device for controlling the recording operation) 44 for controlling the recording operation, for example, controlling the laser scanner and the electrophotographic process, and image processing portion 128 for subjecting the image to be recorded to a smoothing process or the like and various sensors 129 for detecting existence of recording paper or the like.

The communication portion 8 consists of a communication control portion 130 for calling in, calling out and encoding image data; and a connection portion 131 comprising a DSU (Digital Service Unit) and an NCU (Network Control Unit). A communication network 52 and a handset 53 are connected to the communication control portion 130.

An interface 54 for the control portion 11 is an interface for directly transmitting/receiving data to and from the control portion 11, the interface 54 being capable of establishing the connection with an external computer by, for example, RS232C, SCSI or LAN (Local Area Network). The interface 54 for the control portion 11 is used as a scanner, a printer or communication means of an external computer. An HDD (Hard Disk Drive) 55 is a non-volatile storage unit exhibiting a large storage capacity which is used to store image information and the like.

An acoustic apparatus 56 is connected to the control portion 11 and has a sound source for notifying, with sound, transmission/receipt and occurrence of an error.

Figure 5:
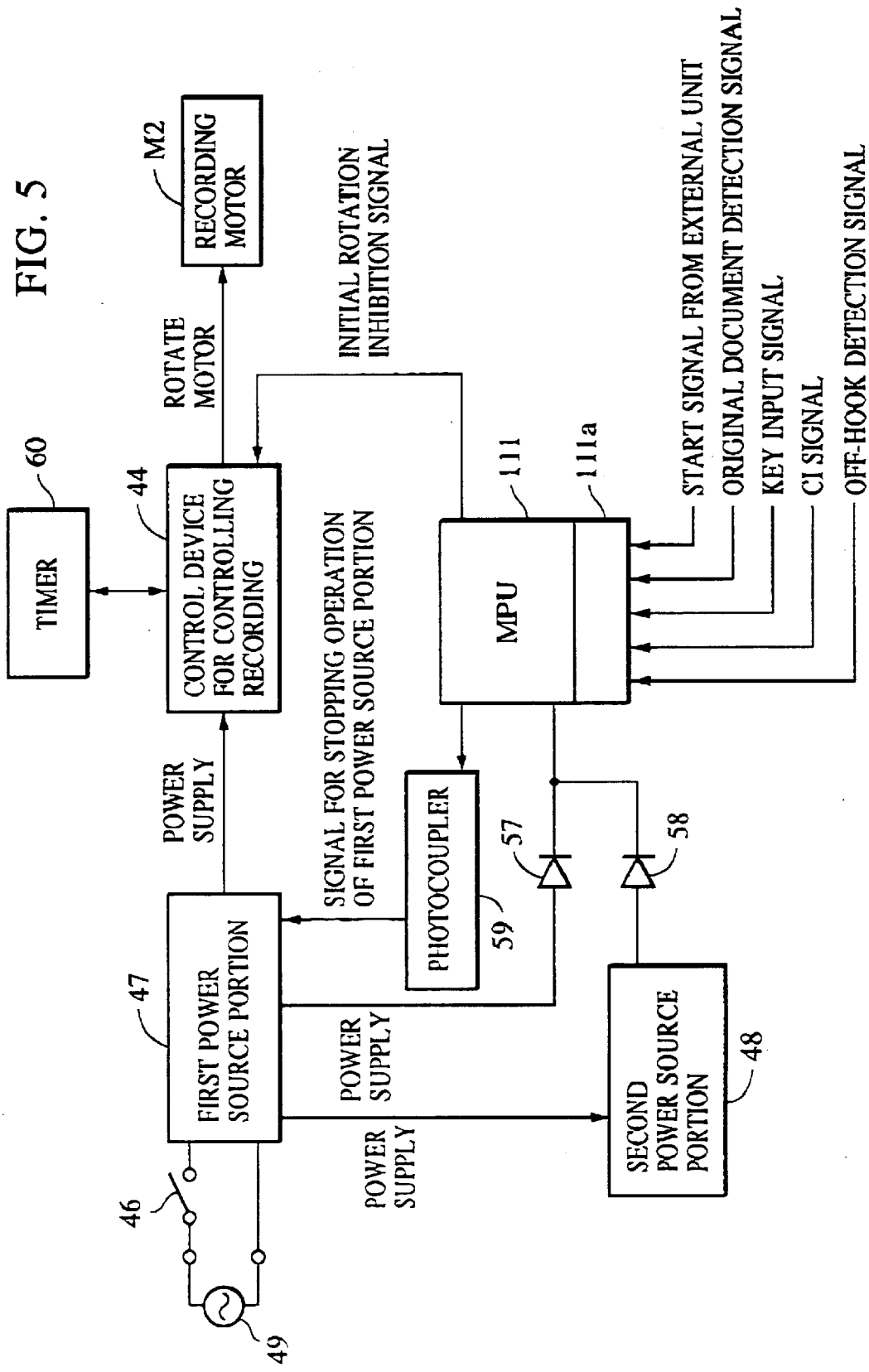
FIG. 5 is a block diagram showing the structure of the control portion shown in FIG. 4.

FIG. 5 is a block diagram showing the structures of the control portion 11 and the recording portion 51 shown in FIG. 4. Referring to FIG. 5, the control device 44 for controlling the recording operation interfaces the MPU 111 for totally controlling the facsimile apparatus and inputs/outputs signals for controlling the recording operation to be performed by the optical portion 4, image forming portion 5, the transference-member conveying portion 6, and the image fixing portion 7 and the like. The MPU 111 is supplied with electric power so as to be operated even in a waiting state (a low power consumption mode). That is, the MPU 111 is a control device for controlling waiting which can be operated in a low power consumption mode as well as in a normal operation mode.

The control device 44 for controlling the recording operation has a ROM in which various instructions for controlling the recording operation are written, means for reading the instruction from the ROM, means for processing the read instruction, a RAM for storing information required by the foregoing processing means and capable of inputting/outputting information, and output means for transmitting a signal generated by the processing circuit. The mutual operations of the foregoing means perform the control.

The control device 44 for controlling the recording operation automatically initial-rotates after the power supply has been started.

A first power supply portion 47 is a switching power source which is supplied with power from an AC power source 49, such as a commercial power source or a spontaneously-generated AC power source, after a switch SW 46 has been switched on, and which converts the level of the power into a voltage level required by each section of the apparatus to supply the electric power. In response to a signal transmitted by the MPU 111, the execution/interruption of the voltage conversion operation can be switched. The control device 44 for controlling the recording operation is supplied with power from only the first power supply portion 47.

A second power supply portion 48 has a secondary battery which supplies power to the MPU 111 only when the switch (SW) 46 for performing/interrupting supply of the power to the apparatus is switched on and the voltage conversion operation of the first power supply portion 47 is interrupted.

The MPU 111 has an input terminal 111a for inputting a restoration signal for making timing, at which the low power consumption operation mode is restored to the normal operation mode, to be appropriate. The input terminal 111a receives, as restoration signals, a start signal from an external unit connected to the apparatus, an original-document detection signal, a key input signal, a CI signal and an off-hook detection signal. The MPU 111 detects the state of the restoration signal at the input terminal 111a to control the shift between the normal operation mode and the low power consumption operation mode.

For example, shifting to the low power consumption operation mode is performed when reading and recording of the apparatus, communication using a telephone line and communication with an external unit are not performed. Then, an instruction to interrupt the operation is issued to the first power supply portion 47.

Restoration from the low power consumption operation mode to the normal operation mode can be performed by simply resetting the power switch SW 46 or by performing reading or recording of the apparatus, communication using a telephone line or communication with an external unit. The commencement of the foregoing operation is determined in accordance with the restoration signal.

Reference numerals 57 and 58 represent diodes for preventing a counterflow of the power supplied from the first power supply portion 47 or the second power supply portion 48 to the MPU 111. Reference numeral 59 represents a photocoupler for converting the operation interruption signal, to be transmitted from the MPU 111 to the first power supply portion 47, into a light signal. Reference numeral 60 represents a timer connected to the control device 44 for controlling the recording operation, the timer 60 being used to measure the time for which the initial rotations are performed.

The operation of this embodiment will now be described. FIGS. 6 to 9 show a flow chart of the operation of this embodiment. The flow shown in FIGS. 6 to 9 shows the total control, to be performed by the MPU 111, and the control to be performed by the control device 44 for controlling the recording operation and the like. The respective operations are performed by the foregoing corresponding sections. If the switch SW 46 is switched on in step S101, the following operations start. In steps S102 to S104 the first power supply portion 47 is turned on so that electric power is supplied to the MPU 111 and the control device 44 for controlling the recording operation. Thus, the MPU 111 and control device 44 for controlling the recording operation are turned on so that a state which is capable of controlling the recording operation is prepared.

In step S105 whether or not an initial-rotation inhibition signal has been supplied from the MPU 111 to the control device 44 for controlling the recording operation is determined. If the control device 44 for controlling the recording operation has determined that the foregoing has not been supplied to the same, the control device 44 for controlling the recording operation causes the timer 60 to count the time in steps S106 and S107. Simultaneously the control device 44 for controlling the recording operation causes the recording motor M2 to start rotating in order to cause the timer 60 to count the time for which the initial rotation is performed by the recording motor M2. The initial rotation time is previously determined to be T1.

In steps S108 and S109 when the time measured by the timer 60 becomes T1, the control device 44 for controlling the recording operation interrupts the rotations of the recording motor M2. Simultaneously, the control device 44 for controlling the recording operation interrupts the operation of the timer 60 in step S110 and resets the counting operation to be performed by the timer 60. Then, the operation proceeds to step S112.

If the control device 44 for controlling the recording operation detects transmission of the initial-rotation inhibition signal in step S105, the operation proceeds to step S111 so that the control device 44 for controlling the recording operation issued, to the MPU 111, a command for requiring interruption of the initial-rotation inhibition signal. As a result, the MPU 111 interrupts transmission of the initial-rotation inhibition signal. Then, the operation proceeds to step S112. In step S112 the MPU 111 detects whether or not the CI signal has been supplied through the telephone line, the CI signal being a signal to be supplied to the input terminal 111a. If the MPU 111 has detected the supply of the CI signal, the MPU 111 turns on a CI-signal detection process flag, and the operation proceeds to step S114. If the MPU 111 has detected that the CI signal has not been supplied, the operation directly proceeds to step S114.

In step S114 the MPU 111 detects as to whether or not a key-input signal, indicating an input operation of the operation portion 9, has been supplied. In the following processes, signals of the foregoing type are supplied to the input terminal 111a as shown in FIG. 5. If the MPU 111 has detected input of the key-input signal, the MPU 111 turns on a key-input process flag in step S115 and the operation proceeds to step S116. If the MPU 111 has not detected the input, the operation proceeds to step S116.

In step S116 a detection is performed as to whether or not an original-document detection signal, indicating setting of the original-document sheet S into the reading portion 3, has been supplied to the MPU 111. If input has been detected, the original-document process flag is turned on instep S117, and the operation proceeds to step S118. If no input has been detected, the operation directly proceeds to step S118.

In step S118 a detection is performed as to whether or not the start signal has been supplied to the MPU 111 from an external unit (terminal equipment), such as an external computer, through the interface 54 for the control portion 11. If input has been detected, an external input process flag is turned on in step S119, and the operation proceeds to step S120. If no input has been detected, the operation directly proceeds to step S120.

In step S120 a detection is performed as to whether or not the CI-signal detection process flag has been turned on. If setting has been detected, a detection is performed as to whether or not the CI-signal detection process has been completed. If a determination has been performed that the CI-signal detection process has not been completed, the operation proceeds to step S122 so that the CI-signal detection process is performed, and the operation proceeds to step S124.

If completion of the CI-signal detection process has been detected in step S121, the operation proceeds to step S123 so that the CI-signal detection process flag is cleared, and the operation proceeds to step S124. If a determination is performed that the CI signal detection process flag has not been turned on, the operation directly proceeds to step S124.

In step S124 whether or not the key-input process flag has been turned on is detected. If setting has been detected, whether or not the key-input process has been completed is detected in step S125. If a detection is performed that the key-input process has not been completed, the operation proceeds to step S126 so that a key-input process is performed, and the operation proceeds to step S128.

If a detection is performed in step S125 that the key-input process has been completed, the operation proceeds to step S127 so that the key-input process flag is cleared and the operation proceeds to step S128. If a detection is performed in step S124 that the key-input process flag has not been turned on, the operation directly proceeds to step S128.

In step S128 whether or not an original-document process flag has been turned on is detected. If setting has been detected, whether or not the original-document process has been completed is detected in step S129. If a detection has been performed that the original-document process has not been completed, the original-document process is performed in step S130, and the operation proceeds to step S132.

If completion of the original-document process has been detected in step S129, the operation proceeds to step S131 so that the original-document process flag is cleared and the operation proceeds to step S132. If a detection is performed in step S128 that the original-document process flag has not been turned on, the operation directly proceeds to step S132.

In step S132 whether or not an external input process flag has been turned on is detected. If a detection is performed that the external input process flag has been turned on, whether or not the external input process has been completed is detected in step S133. If a detection is performed that the external input process has not been completed, the external input process is performed in step S134 and the operation proceeds to step S136.

If completion of the external input process has been detected in step S133, the operation proceeds to step S135 so that the external input process flag is cleared and the operation proceeds to step S136. If the external input process flag has not been turned on in step S132, the operation directly proceeds to step S136.

In step S136 whether or not the CI-signal detection process flag has been turned on is again detected. If setting has been detected, the operation returns to step S112. If no setting has been detected, the operation proceeds to step S137.

In step S137 whether or not the key-input process flag has been turned on is again detected. If setting has been detected, the process returns to step S112. If no setting is detected, the operation proceeds to step S138.

In step S138 whether or not the original-document process flag has been turned on is again detected. If setting has been detected, the process returns to step S112. If no setting has been detected, the operation proceeds to step S139.

In step S139 whether or not the external input process flag has been turned on is again detected. If setting has been detected, the process returns to step S112. If no setting has been detected, the operation proceeds to step S140.

If a detection has been performed that no flag has been turned on in steps S136 to S139, a determination is performed that the apparatus is in a waiting state so that a signal for interrupting the operation of the first power supply portion 47 is transmitted in step S140 and the operation of the first power supply portion 47 is interrupted in step S141. By interrupting the operation of the first power supply portion 47, supply of power to the control device 44 for controlling the recording operation is interrupted in step S142. Thus, the operation of the control device 44 for controlling the recording operation is interrupted.

Also power supply to the MPU 111 from the first power supply portion 47 is interrupted and the source for supplying power to the MPU 111 is switched to the second power supply portion 48 in step S143. Then, the MPU 111 sets the mode thereof to the low power consumption operation mode.

The MPU 111, set to the low power consumption operation mode, detects in step S145 whether or not the CI signal has been supplied through a telephone line in response to the restoration signal at the input terminal 111a. If supply of the CI signal has been detected, the MPU 111 is restored to the normal operation mode in step S146. Then, the operation proceeds to step S147 so that the CI-signal detection process flag is turned on.

Then, the operation proceeds to step S157 so that the MPU 111 transmits the initial-rotation inhibition signal to the control device 44 for controlling the recording operation. In step S158 output of the signal for interrupting the operation of the first power supply portion 47 to the first power supply portion 47 is interrupted. In step S159 the operation of the first power supply portion 47 restarts. In step S160 the source for supplying power to the MPU 111 is switched from the second power supply portion 48 to the first power supply portion 47. Then, the process returns to step S104. If a detection is performed in step S145 that the CI signal has not been supplied, the operation proceeds to step S148.

In step S148 the MPU 111 detects whether or not an input operation has been performed with the operation portion 9 in accordance with the restoration signal at the input terminal 111a. If the input operation has been detected, the MPU 111 is restored to the normal operation mode in step S149. In step S150 the key-input process flag is turned on and the operation proceeds to step S157.

In steps S157 to S160 the MPU 111 performs the foregoing processes. If no input operation has been detected in step S148, the operation proceeds to step S151.

In step S151 the MPU 111 detects whether or not an original document has been set in the reading portion 3 in accordance with the input terminal 111a for the restoration signal. If setting of the original document has been detected, the MPU 111 is returned to the normal operation mode in step S152. In step S153 the original-document process flag is turned on and the operation proceeds to step S157.

The MPU 111 performs the foregoing processes in steps S157 to S160. If a detection has been performed in step S151 that no original document has been set, the operation proceeds to step S154.

In step S154 the MPU 111 detects whether or not an input has been performed from an external unit, such as an external computer, through the interface 54 for the control portion 11 in accordance with the input terminal 111a for the restoration signal. If the input has been detected, the MPU 111 is restored to the normal operation mode in step S155. In step S156 the external input process flag is turned on and the operation proceeds to step S157.

In steps S157 to S160 the MPU 111 performs the foregoing processes. If no input has been detected in step S154, the operation returns to step S145.

As described above, according to the first embodiment, the initial rotation is inhibited when the low power consumption operation mode is switched to the normal operation mode. Therefore, the initial rotation is not performed when the low power consumption operation mode has been shifted to the normal operation mode. As a result, when the apparatus has been restored from the waiting state to the operation state, the recording operation can immediately be performed. Moreover, the initial rotation is performed only when the power supply is performed.

According to the first embodiment, the normal operation mode includes an off-hook operation and, therefore, the operation for recording facsimile-received information can immediately be performed even if the waiting state has been restored to the normal operation mode.

Second Embodiment

A second embodiment has a structure in which control of the initial rotation, to be performed when the AC power source 49 is turned on, is added to the structure according to the first embodiment. Since the second embodiment has a similar overall structure as that according to the first embodiment, descriptions of the structure and operation are omitted and the same elements are given the same reference numerals.

Figure 10:
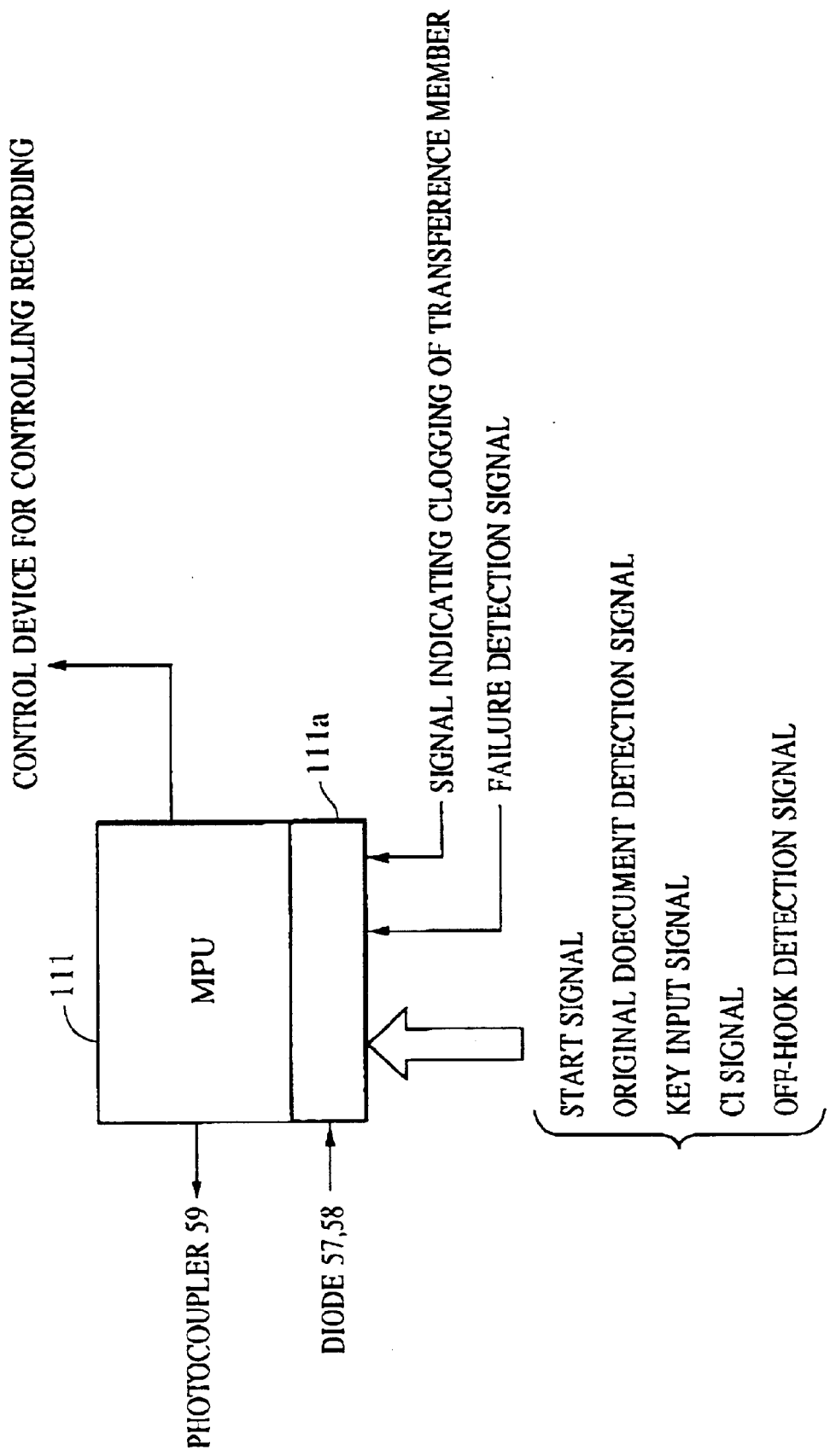
FIG. 10 is a block diagram showing the structure of an essential portion of a second embodiment of the present invention.
Figure 11:
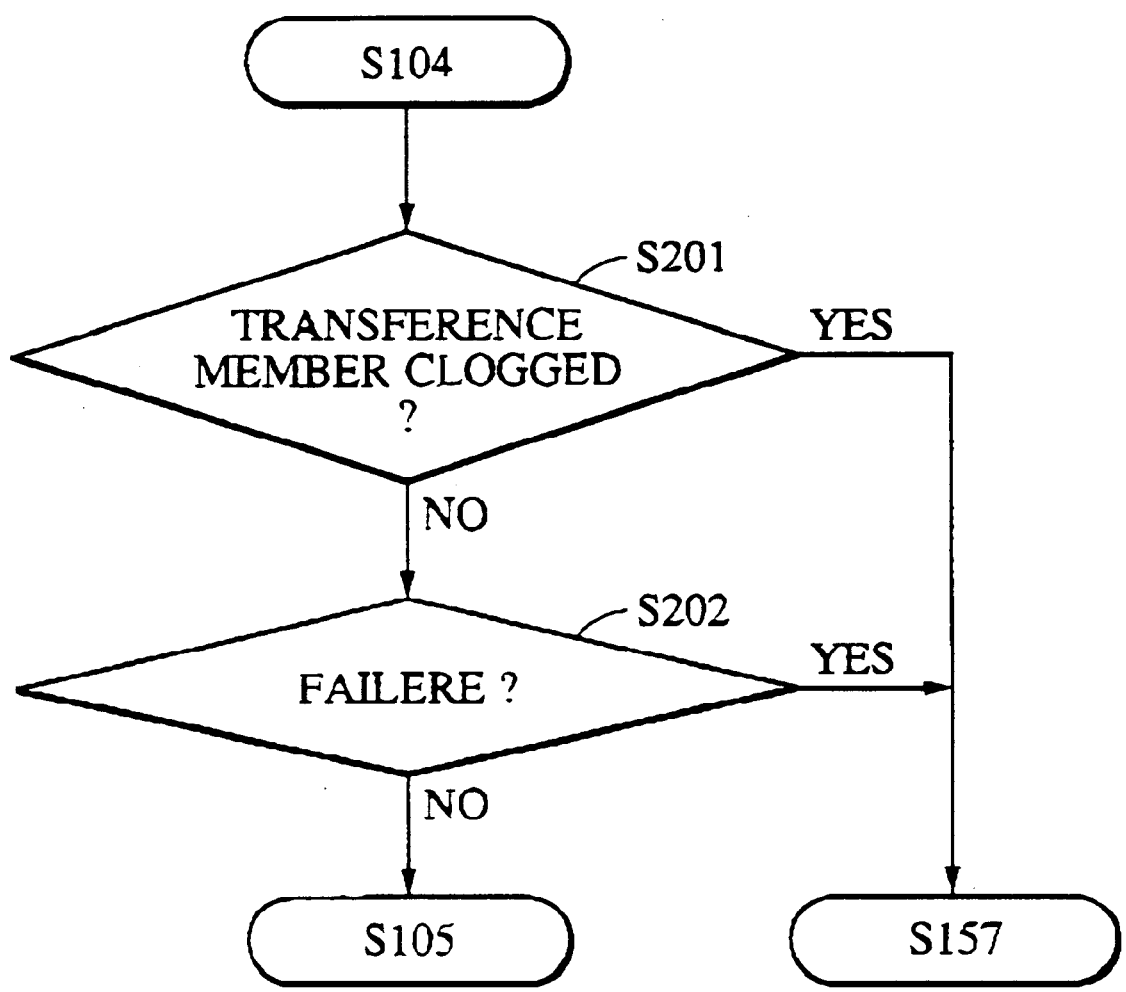
FIG. 11 is a flow chart of an essential operation of the second embodiment.

FIG. 10 is a block diagram showing essential units according to the second embodiment of the present invention. FIG. 11 is a flow chart of main operations according to the second embodiment. The structure is formed as shown in FIG. 10 such that the input terminal 111a of the MPU 111 is arranged to receive, as well as the signals shown in FIG. 5, a transference-member clogging detection signal, indicating clogging of a transference member, and failure detection signals, indicating a variety of failure states in which the recording operation cannot be performed, the signals being received through electric signal lines.

The operation will now be described. As shown in FIG. 11, in step S104 (see FIG. 6) the operation of the control device 44 for controlling the recording operation is started. In step S201 a state is detected in which a transference member is clogged in a conveyance system formed from the paper-supply portion to the paper-discharge portion. In step S202 a state of a failure is detected. If either of the transference-member clogging detection signal or the failure detection signal is detected by the MPU 111 in steps S201 and S202, a determination is performed that the recording operation cannot be performed and thus the initial rotation is inhibited. Thus, the operation proceeds to step S157 so that a signal for inhibiting the initial-rotation is transmitted. As a result, the recording motor M2 maintains the non-operation state.

As described above, according to the second embodiment, the initial rotation can be inhibited if an abnormal state has been detected. As a result, a wasteful operation, such that the initial rotation is performed in a state where the recording operation cannot be performed, can be prevented.

Since the first and second embodiments have the structure such that the initial-rotation inhibition signal is interrupted by transmitting the command for requiring interruption of the initial-rotation inhibition signal in step S111, a signal for interrupting the initial-rotation inhibition signal may be transmitted in place of the foregoing command. After the MPU 111 has transmitted the initial-rotation inhibition signal, the MPU 111 may use a timer to interrupt the transmission of the initial-rotation inhibition signal after a lapse of a predetermined time.

In the case where the handset 53 is connected to the apparatus, the apparatus is in the waiting mode. Thus, if the handset 53 is off-hook in the case where the MPU 111 is in the low power consumption operation mode, shifting to the normal operation mode may be performed similar to the input of the CI signal, an input of a key, setting of an original document or starting from an external unit, such as an external computer.

As described above, according to the present invention, when the low power consumption operation mode is shifted to the normal operation mode, the inhibition means inhibits the operation of the transference-member conveyance means to inhibit the initial rotation in response to the signal generated by the generating means. Thus, in the case where the apparatus has been shifted from the waiting state to the operation state, the recording operation can immediately be performed.

When the power-source connection means is shifted from a disconnected state to a connected state, the inhibition means allows the operation of the foregoing operation means regardless of the signal generated by the generating means. Therefore, when the power is supplied, the initial rotation is performed to initialize a predetermined section or detect a failure.

In particular, determination can be performed as to whether or not the shift from the low power consumption operation mode to the normal operation mode has been performed due to turning of the power source on or shifting from the waiting state. Thus, even if facsimile receipt to be completed in a short time is performed, the recording operation can immediately be performed. Thus, a wasteful operation, such that a memory substituted receiving operation, though no failure has taken place, can be prevented. Moreover, waste of time, such that an urgent facsimile operation is performed by extracting data to be facsimile-communicated from a memory, can be prevented. Since the recording operation can immediately be performed when started as an output apparatus of an external unit, response indicating occurrence of an error, as has been performed with the conventional apparatus, can be prevented. Thus, the adaptation performance can further be improved.

Third Embodiment

Figure 12:
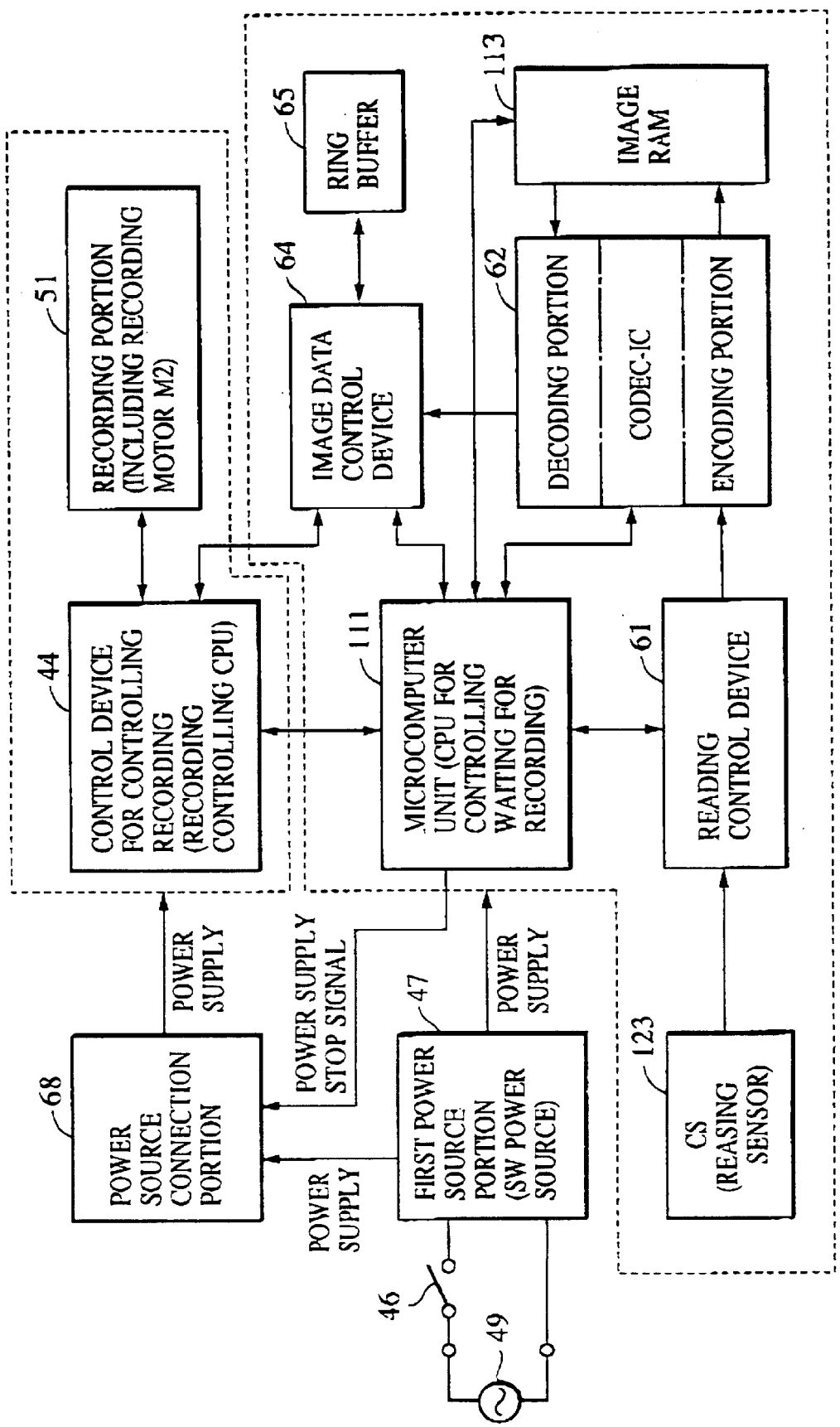
FIG. 12 is a block diagram showing the structure of the control portion shown in FIG. 4.

FIG. 12 is a block diagram of the structure of a third embodiment. Referring to FIG. 12, this embodiment will now be described. The description below will be performed about only different portions from the structure of the first embodiment. Referring to FIG. 12, the same elements as those of the first embodiment are given the same reference numerals and their descriptions are omitted.

A power-source connection portion 68 switches whether or not the power from the first power supply portion 47 is supplied to the recording portion 51 in accordance with the control performed by the MPU 111. Since the MPU 111 controls the power-source connection portion 68 as described above, the shifting between the normal operation mode and the low power consumption operation mode of the apparatus is controlled.

A reading control device 61 digitizes an image read by a contact-type image sensor 123 with an appropriate level and subjects the digitized image to a binary-coding process for processing the image.

A CODEC-IC62 encodes binary-coded data, to be transmitted from the reading control device 61, with a predetermined MH or MR method and stores the data in the image RAM 113.

The image data stored in the image RAM 113 is used to transmit or record the image.

Shifting to the low power consumption operation mode of the apparatus is performed when image data for one page, to be recorded to the image RAM 113, has not been stored or the recording operation has not been performed.

When the shift of the operation mode is performed, a power-supply interruption signal is transmitted from the MPU 111 to the power-source connection portion 68.

Restoration from the low power consumption operation mode to the normal operation mode is determined in accordance with a fact that image data for one page to be recorded has been stored in the RAM 113. Simultaneously, transmission of the power-supply interruption signal from the MPU 111 to the power-source connection portion 68 is interrupted.

The interruption of the transmission of the power-supply interruption signal to the power-source connection portion 68 causes power supply from the first power supply portion 47 to the control device 44 for controlling the recording operation to be started through the power-source connection portion 68.

The started control device 44 for controlling the recording operation detects the states of the sections concerning the recording operations, such as jamming of and a failure to determine whether or not the recording operation can be started.

If the recording operation can be started, a recording-operation enable signal is transmitted to the MPU 111.

When the MPU 111 receives the recording-operation enable signal, the MPU 111 again decodes data in the image RAM 113 by the CODEC-IC62. The decoded data is transferred to a ring buffer 65 including a plurality of line buffers through a record image data control device 64. When the ring buffer 65 is filled with data, the control device 44 for controlling the recording operation is caused to start recording so that the recording operation is started.

When the recording operation has been started, the control device 44 for controlling the recording operation causes the recording motor M2 to start rotating.

Simultaneously, the control device 44 for controlling the recording operation notifies the MPU 111 that the recording operation is being performed.

After the recording motor M2 has been slowed up, the transference members P set in the first cassette 29 or the second cassette 30 are sequentially separated and conveyed by the paper-supply roller 29a or 30a rotated by the paper supply solenoid SL1 or SL2.

The timing of the operation for recording of an image onto the conveyed transference member P is made to be appropriate by the resist sensor 31b.

The moving transference member P causes the actuator 66 (not shown) to be operated such that the transference member P disturbs the optical passage for the photointerrupter comprising the actuator 66 as the resist sensor 31b. As a result, the control device 44 for controlling the recording operation detects the leading end of the transference member P.

Simultaneously with the moment at which the leading end of the transference member P is detected, the control device 44 for controlling the recording operation starts the operation of a timer counter T1.

When the value of the timer counter T1 has reached a predetermined value, the control device 44 for controlling the recording operation transmits a vertical synchronizing signal to the MPU 111.

When the MPU 111 receives the vertical synchronizing signal, the MPU 111 starts the operation of a timer counter T2.

When the value of the timer counter T2 has reached a predetermined value, the MPU 111 allows the record image data control device 64 to receive a horizontal synchronizing signal generated by the control device 44 for controlling the recording operation when a laser beam is made incident upon a fixed mirror 46 (not shown) disposed in the optical path for the laser beam.

In response to the laser beams, at predetermined intervals, supplied from the control device 44 for controlling the recording operation, the record image data control device 64 causes the line buffer in the ring buffer 65 to transmit binary-coded data for one line.

The control device 44 for controlling the recording operation turns the laser diode 17 on/off in accordance with the binary-coded data supplied from the line buffer in the ring buffer 65.

Simultaneously, the image forming portion 5 is operated so that a toner image is formed on the photosensitive drum 21.

When the photosensitive drum 21, having the toner image formed thereon, has been rotated to a position at which transference to the transference member P is performed, the timing, at which the vertical synchronizing signal is transmitted, is made to be appropriate in such a manner that start of the transference is performed at a desired position in the transference member P.

As the operation of recording the image proceeds, the transference member P is further conveyed in such a manner that the trailing end of the transference member P passes through the actuator 66. When the actuator 66 has been returned to the home position, the actuator 66 opens the optical path for the photointerrupter for use in the resist sensor 31b. As a result, the control device 44 for controlling the recording operation detects the trailing end of the transference member P.

Simultaneously with the detection of the trailing end of the transference member P, the control device 44 for controlling the recording operation starts the operation of a timer 3.

When the value of the timer 3 has reached a predetermined value, the control device 44 for controlling the recording operation transmits a page-break requirement signal to the MPU 111.

When the MPU 111 has received the page-break requirement signal from the control device 44 for controlling the recording operation, the MPU 111 determines whether or not images to be further recorded exist. If images to be recorded exist, the MPU 111 transmits a page-break signal to the control device 44 for controlling the recording operation.

In response to the page-break signal received from the MPU 111, the control device 44 for controlling the recording operation again separates, conveys and records the transference member P set in the first cassette 29 or the second cassette 30.

If no image to be recorded exists through the MPU 111 has received the page-break requirement signal, the MPU 111 does not transmit the page-break signal to the control device 44 for controlling the recording operation.

If the control device 44 for controlling the recording operation does not receive the page-break signal within a predetermined period for the timer 3, the control device 44 for controlling the recording operation performs the procedure for ending the recording operation. After the procedure for ending the recording operation has been completed, the control device 44 for controlling the recording operation notifies the MPU 111 that the recording operation is not being performed.

When the MPU 111 has received, from the control device 44 for controlling the recording operation, the notification that the recording operation is not being performed, the MPU 111 detects whether or not image data for at least one page to be recorded on the image RAM 113 exists.

If the image data exists, the process of the image data to been recorded is started.

If image data for at least one page, to be recorded, does not exist, the MPU 111 transmits a power-supply interruption signal to the second power supply portion 48 so that power supply from the first power supply portion 47 to the control device 44 for controlling the recording operation is interrupted.

As a result, the mode of the apparatus is shifted from the normal operation mode to the low power consumption operation mode.

As described above, according to the first embodiment, the low power consumption operation mode is employed in the case where the recording operation is not performed; and shifting to the normal operation mode is performed when the recording operation is started. Thus, in a state where a recording operation is not performed, that is, in a case where the recording operation is waited for, excess consumption of electric power can be prevented.

The operation of the third embodiment will now be described with reference to a flow chart shown in FIG. 15.

Figure 15A:
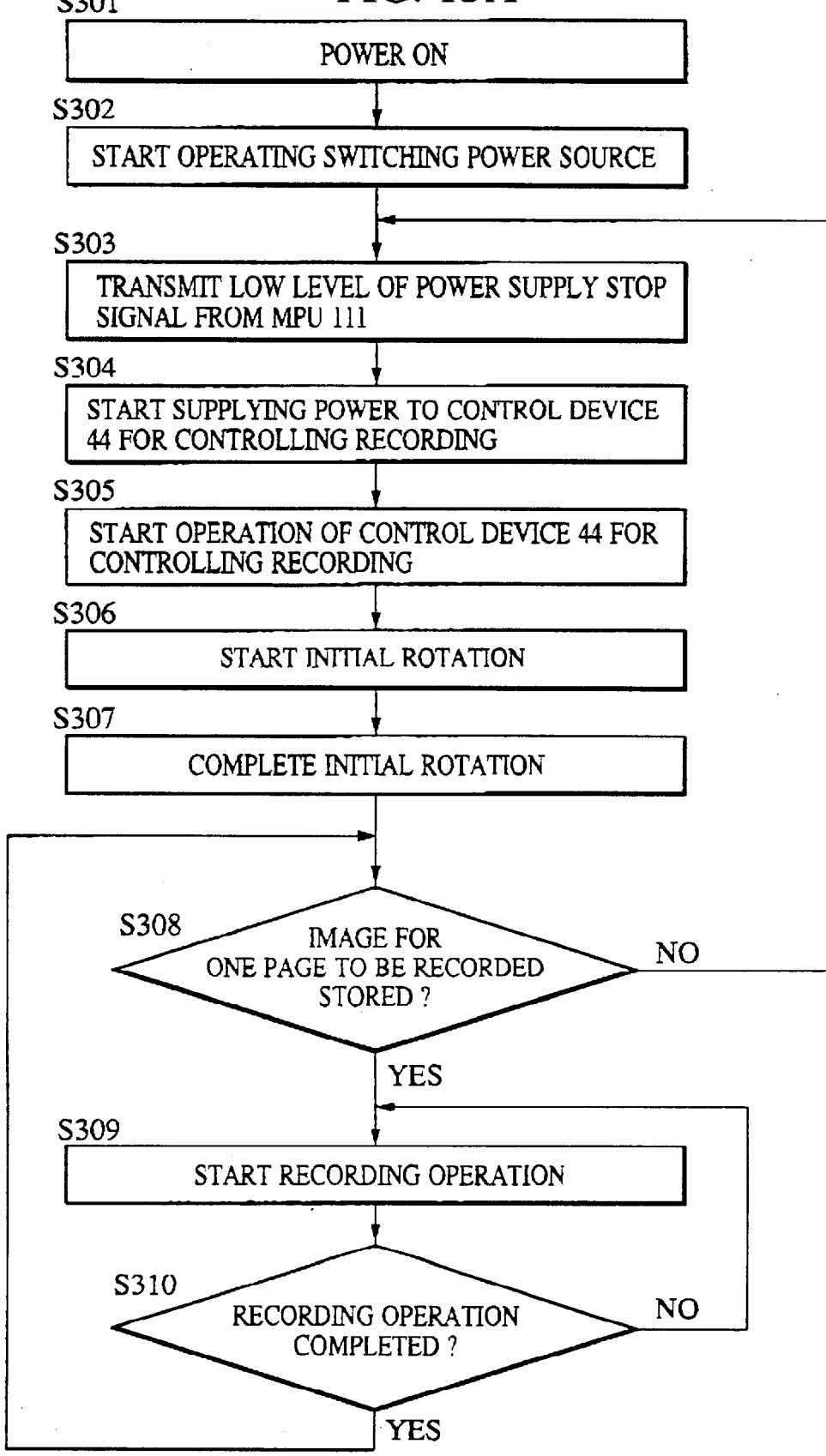

The flow chart shown in FIG. 15 shows the total control to be performed by the MPU 111 and the control to be performed by the control device 44 for controlling the recording operation or the like. The respective operations are performed by the corresponding sections as described above.

In step S301 the switch SW 46 is switched on. In step S302 the operation of the switching power source of the first power supply portion 47 is started. Thus, power supply from the first power supply portion 47 to the MPU 111 is started so that the operation of the MPU 111 is started.

In step S303 a low level power-supply interruption signal is transmitted by the MPU 111.

In step S304 power supply from the power-source connection portion 68 to the control device 44 for controlling the recording operation is started. In step S305 the control device 44 for controlling the recording operation starts the operation thereof.

In step S306 the control device 44 for controlling the recording operation causes the recording portion 51 to start the initial rotation operation.

In step S307 the control device 44 for controlling the recording operation interrupts the initial rotation operation of the recording portion 51 after the initial rotation process has been completed.

In step S308 the MPU 111 determines whether or not images for one page to be recorded have been stored in the image RAM 113. If images for one page to be recorded have been stored in the image RAM 113, the operation proceeds to step S309. If the images have not been stored, the operation proceeds to step S311.

In step S309 recording of images for one page stored in the image RAM 113 is started. In step S310 completion of recording of the images for one page stored in the image RAM 113 is supervised. If the images for one page have been recorded, the operation returns to step S308. If images for a next page have been stored in the image RAM 113, recording of the images for the next page is started in step S309. Then, the routine in steps S308, S309 and S310 is repeated until no image to be recorded exists.

In step S311 a high-level signal for interrupting power supply is transmitted from the MPU 111.

In step S312 power supply from the power-source connection portion 68 to the control device 44 for controlling the recording operation is interrupted. In step S313 the portion of the control device 44 for controlling the recording operation is interrupted.

In step S314 whether or not images for one page to be recorded have been stored in the image RAM 113 is determined. If the images for one page to be recorded have been stored in the image RAM 113, the operation proceeds to step S303 so that the foregoing process is repeated.

According to the third embodiment, after determination of the images for one page to be recorded being stored has been performed, power is supplied to the recording portion 51. Therefore, electric power consumption can be reduced as compared with the structure in which power supply to the recording portion is started prior to storage of the images for one page to be recorded.

Fourth Embodiment

A fourth embodiment has a structure such that control of the initial rotation is added to the structure of the third embodiment.

Since the overall structure of the fourth embodiment is the same as that of the third embodiment, descriptions of the structure and operation of the fourth embodiment are omitted. The same elements are given the same reference numerals and they are omitted form description.

Figure 13:
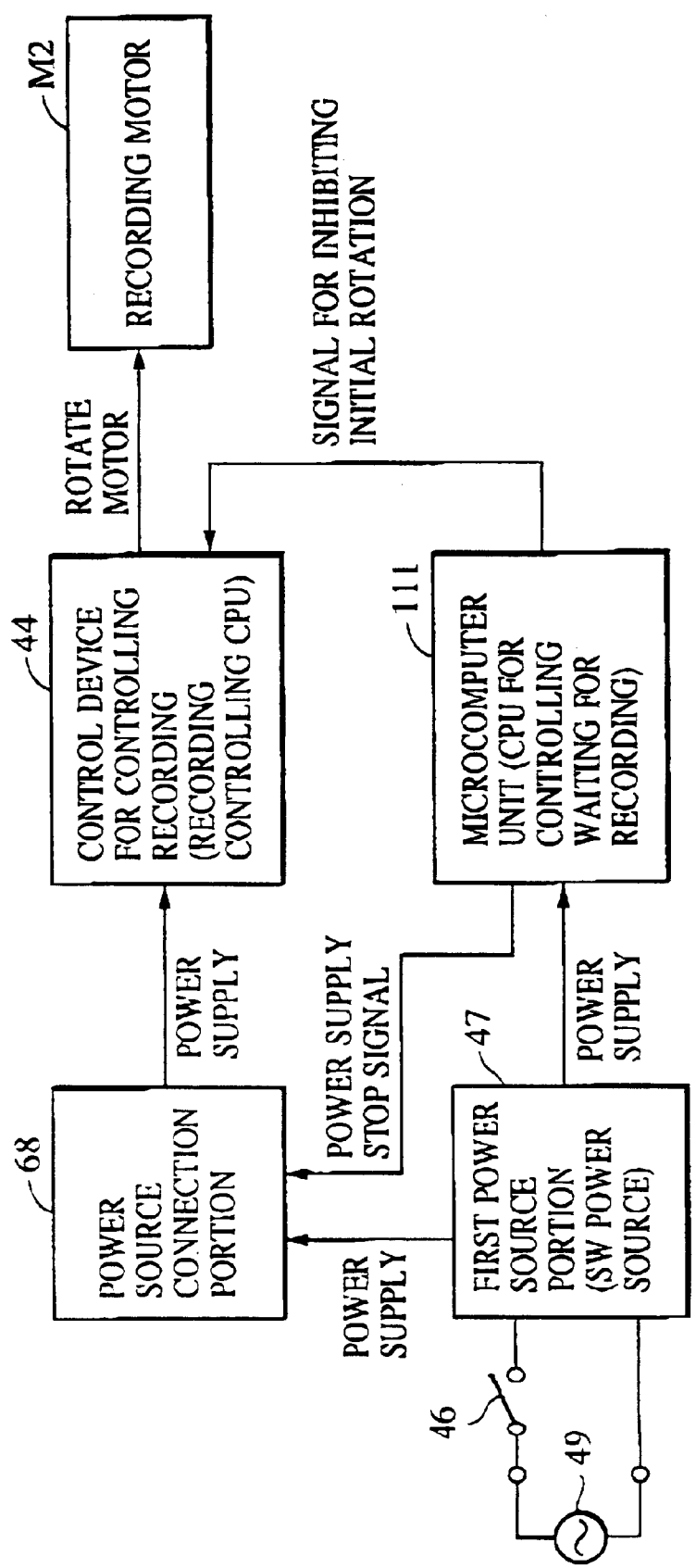
FIG. 13 is a block diagram showing the structure of the control portion shown in FIG. 4.

FIG. 13 is a block diagram of an essential portion of the fourth embodiment of the present invention.

The structure of the fourth embodiment is arranged in such a manner that an initial-rotation inhibition signal is supplied to the control device 44 for controlling the recording operation through an electric line as shown in FIG. 13 as well as the signals shown in FIG. 12.

The operation of the fourth embodiment will now be described.

When the switch SW 46 has been switched on, power supply to the MPU 111 is started so that the MPU 111 starts operating to totally control the apparatus.

The MPU 111 continuously transmits the power-supply interruption signals to the power-source connection portion 68 from the start of the operation thereof. Furthermore, the MPU 111 continuously causes the control device 44 for controlling the recording operation not to transmit the initial-rotation inhibition signal. The second power supply portion 48 detects the power-supply interruption signal so that power supply to the control device 44 for controlling the recording operation and that to the recording portion 51 including recording motor M2 are not performed.

The MPU 111, to which electric power is supplied, executes the initial procedure from the leading address in the program in accordance with the procedure written on the ROM 112.

During execution of the initial procedure, the MPU 111 interrupts transmission of the power-supply interruption signal to the power-source connection portion 68.

Due to the interruption of transmission of the power-supply interruption signal, the power-source connection portion 68 starts supplying electric power to the control device 44 for controlling the recording operation and the recording portion 51. As a result, the mode of the apparatus is shifted from the low power consumption operation mode to the normal operation mode.

The control device 44 for controlling the recording operation, to which electric power has been supplied, performs an operation for enabling the recording operation to be performed.

In an image forming apparatus adapted to the electrophotographic method, jam detection and checking of the opening/closing cover of the apparatus are performed when supply of electric power is started. If the foregoing states are normal, the motor for conveying transference members is rotated so that the initial rotation is performed. As a result, initialization of the electrophotographic process portion, detection of a failure of a fixing unit by detecting the temperature realized when electric power is supplied to the fixing unit for a short time and detection of existence of toner are performed. To complete the foregoing operations, at least the time is required to rotate once the photosensitive drum in the electrophotographic process portion.

To perform the foregoing operations, the control device 44 for controlling the recording operation reads the contents of the ROM (Read Only Memory) storing various instructions for the recording operation written thereon when the power supply has been started. Furthermore, the control device 44 for controlling the recording operation determines whether or not the initial-rotation inhibition signal has been supplied from the MPU 111. After determination has been performed that the MPU 111 has not transmitted the initial-rotation inhibition signal, the program routine for use when power is supplied is used to perform the foregoing operations including the initial rotation.

In a period from the start of the operation of the control device 44 for controlling the recording operation to the completion of the initial rotation, the control device 44 for controlling the recording operation continuously notifies the MPU 111 that the recording operation is being performed. After the initial rotation has been completed, the control device 44 for controlling the recording operation interrupts the notification that the recording operation is being performed.

When the MPU 111 detects interruption of the notification from the control device 44 for controlling the recording operation that the recording operation is being performed, the MPU 111 starts transmitting the power-supply interruption signal to the power-source connection portion 68.

As a result, the power-source connection portion 68 interrupts power supply to the control device 44 for controlling the recording operation and the recording portion 51. Then, the mode of the apparatus is shifted from the normal operation mode to the low power consumption operation mode.

As described above, the initial rotation is controlled when the switch SW 46 is switched on.

Then, the control of the initial rotation will now be described which is performed when image data for one page to be recorded has been stored in the image RAM 113 due to receipt of a facsimile image supplied through a telephone line, reading of image data for a copying operation or transference of image, to be recorded, which is supplied from an external computer through an external interface.

When image data for one page has been stored, transmission of the power-supply interruption signal from the MPU 111 to the power-source connection portion 68 is interrupted. Simultaneously, the MPU 111 transmits the initial-rotation inhibition signal to the control device 44 for controlling the recording operation.

When the power source connection portion 68 detects suspension of the power-supply interruption signal which is supplied from the MPU 111, the power-source connection portion 68 restarts power supply to the control device 44 for controlling the recording operation and the recording portion 51 including the recording motor M2.

When electric power is again supplied, the mode of the apparatus is shifted from the low power consumption operation mode to the normal operation mode. Moreover, the control device 44 for controlling the recording operation is turned on so that a state which is capable of controlling the recording operation is realized.

When electric power is supplied to the control device 44 for controlling the recording operation, the control device 44 for controlling the recording operation reads the contents of the ROM, on which the various instruction for the recording operation have been written, to execute the procedure.

During the foregoing procedure, the control device 44 for controlling the recording operation detects whether or not the initial-rotation inhibition signal has been transmitted from the MPU 111. When the control device 44 for controlling the recording operation detects transmission of the initial-rotation inhibition signal from the MPU 111, the control device 44 for controlling the recording operation does not perform the initial rotation process but skips the same to start execution of the recording procedure.

As described above, according to the fourth embodiment, the initial rotation is inhabited when the mode of the apparatus is shifted from the low power consumption operation mode to the normal operation mode. Therefore, the inhibition of the initial rotation at the time of shifting of the mode of the apparatus from the low power consumption operation mode to the normal operation mode attains, in addition to the effect of the third embodiment, an effect that the recording operation can immediately be performed in the case where the apparatus has been restored from the waiting state to the operation state. However, the initial rotation can be performed only when the power is supplied to the apparatus.

The operation of the fourth embodiment will now be described with reference to a flow chart shown in FIG. 16.

Figure 16A:
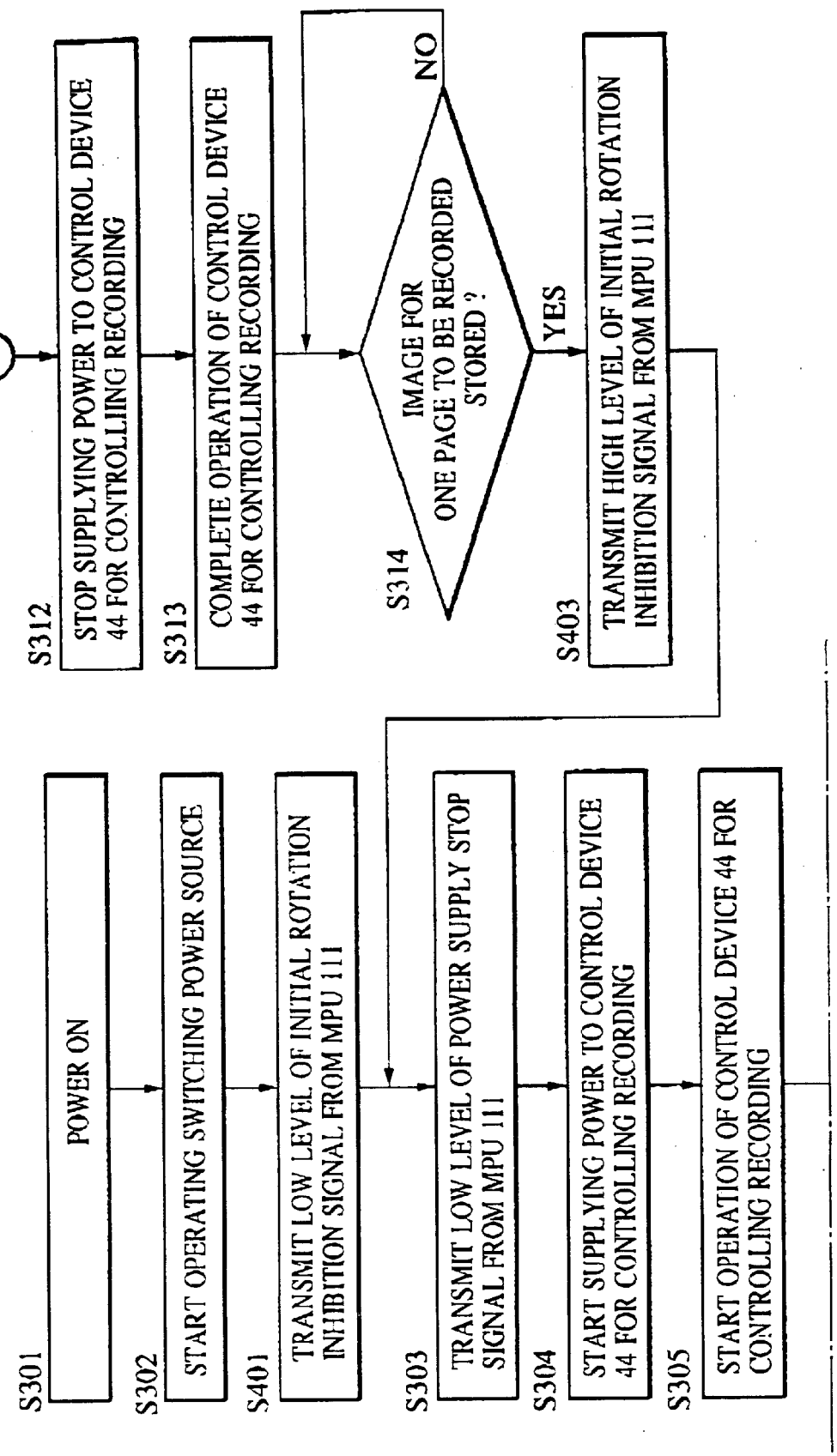
Figure 17B:
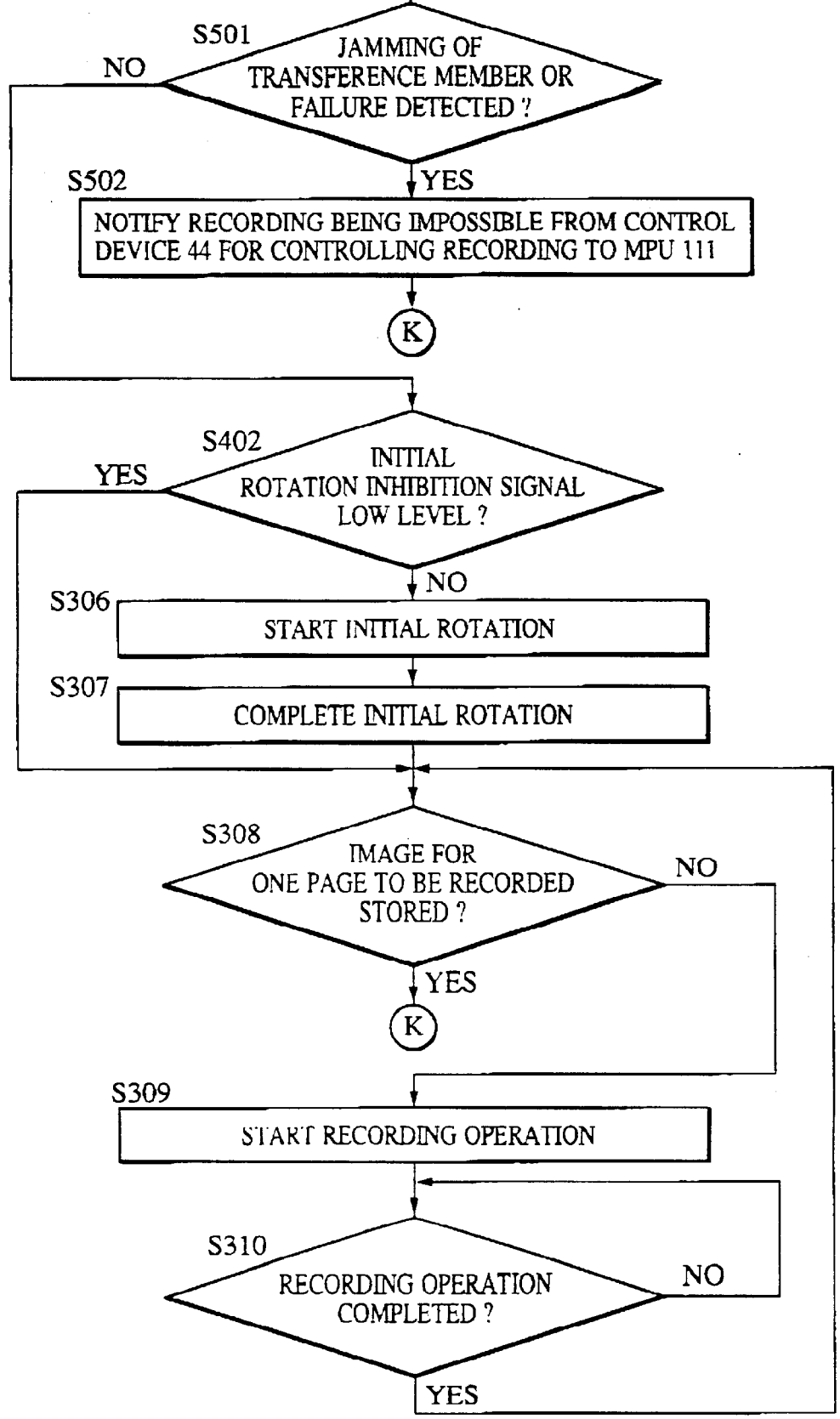
Figure 18:
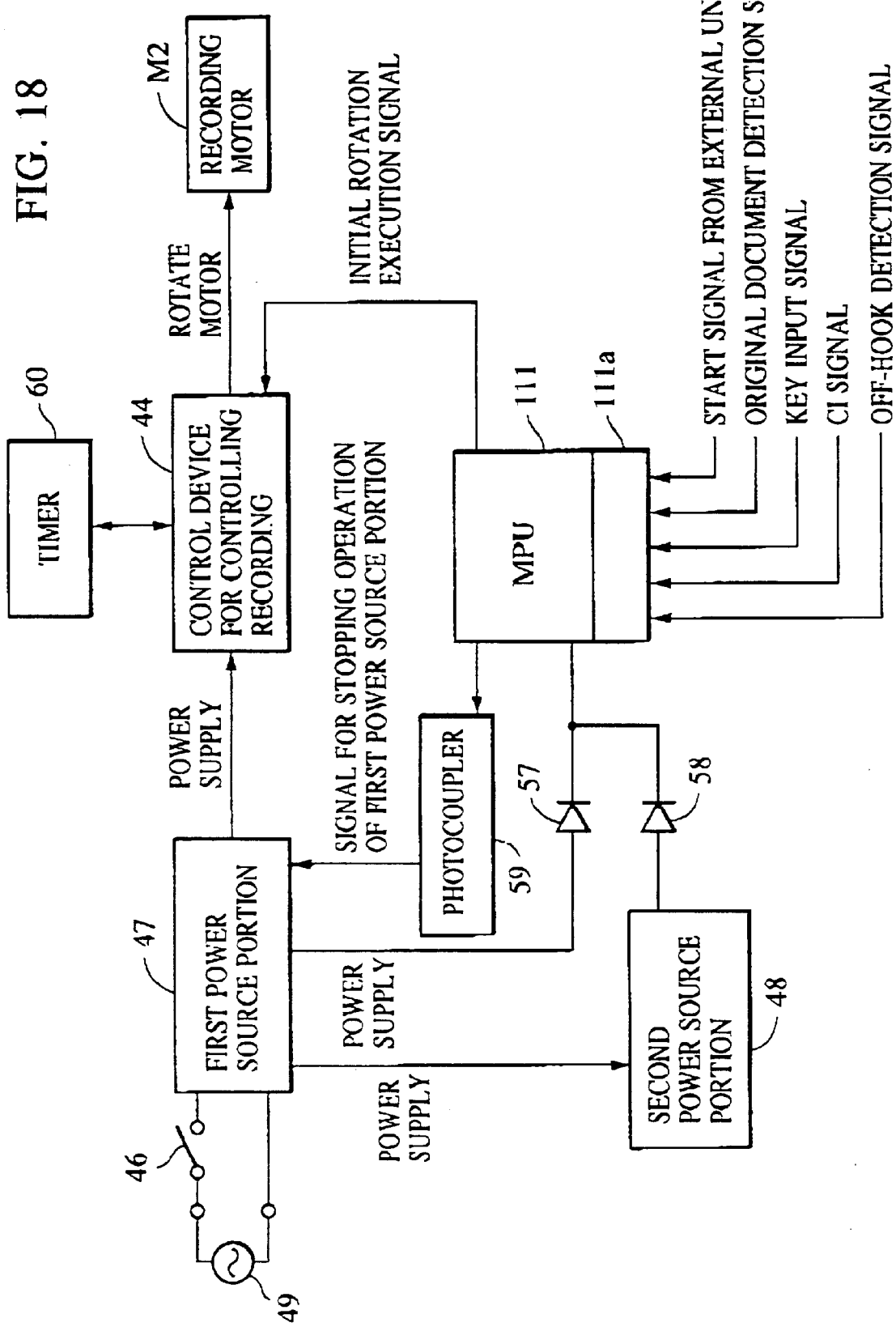
FIG. 18 is a block diagram showing the structure of a control portion according to a sixth embodiment.

Referring to FIG. 16, portions different from those shown in FIG. 15 are described; the same elements are given the same reference numerals; and they are omitted from description.

In step S401 a low-level initial-rotation inhibition signal is transmitted from the MPU 111.

In step S402 whether or not a high-level initial-rotation inhibition signal has been transmitted from the MPU 111 is determined. If the high-level signal has been transmitted, the operation proceeds to step S308. If the foregoing signal has not been transmitted, the operation proceeds to step S306.

In step S403 the high-level initial-rotation inhibition signal is transmitted from the MPU 111.

Fifth Embodiment

A fifth embodiment has a structure such that control of the initial rotation is added to the structure of the fourth embodiment.

Since the overall structure of the fifth embodiment is the same as that of the second embodiment, the descriptions of the structure and operation are omitted, and the same elements are given the same reference numerals.

Figure 14:
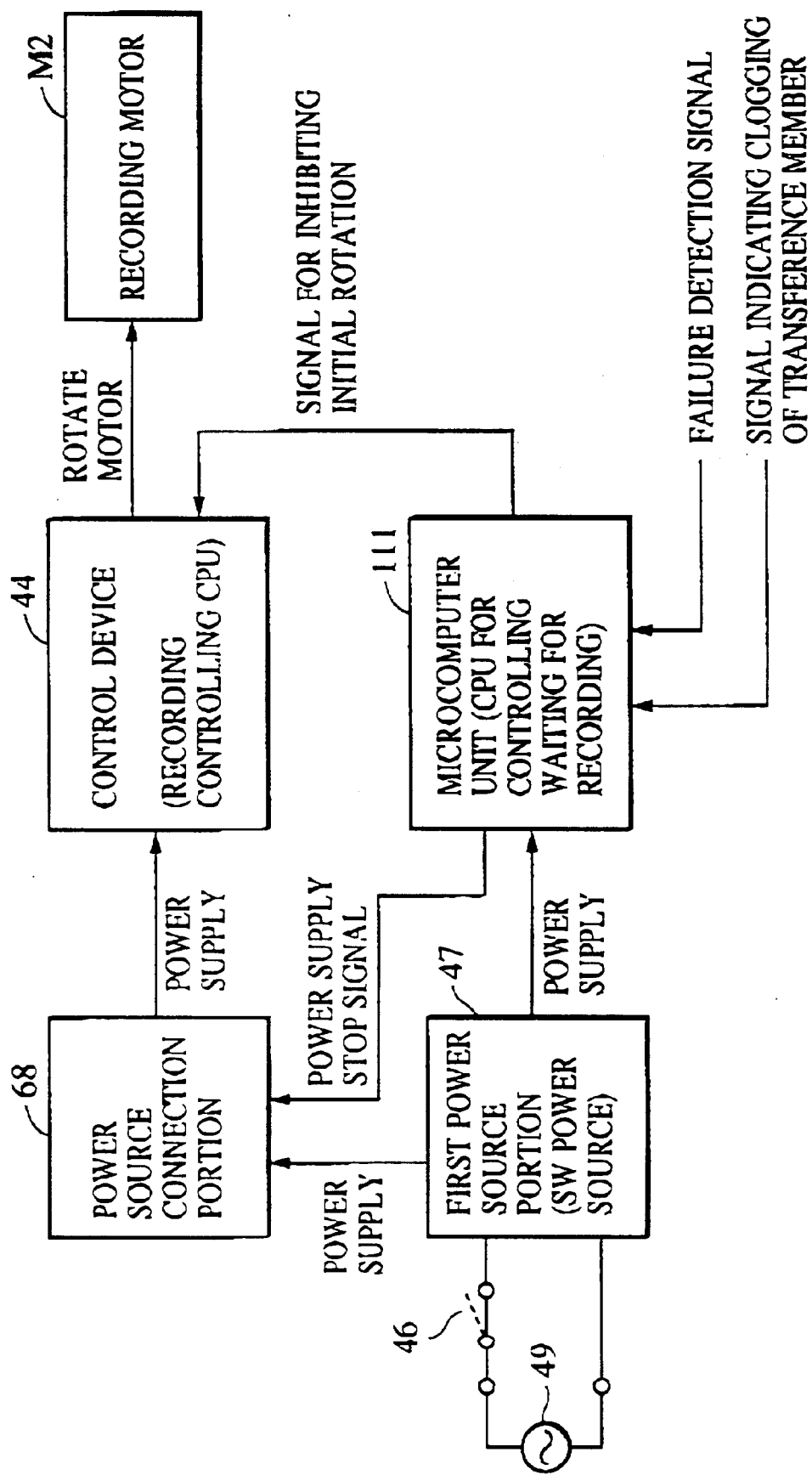
FIG. 14 is a block diagram showing the structure of the control portion shown in FIG. 4.

FIG. 14 is a block diagram showing an essential portion of this embodiment. As shown in FIG. 14, the structure of this embodiment has an arrangement that the MPU 111 is, through electric lines, supplied with, as well as the signals shown in FIGS. 12 and 13, a transference-member clogging detection signal indicating clogging of a transference member and a failure detection signal indicating that the recording operation cannot be performed due to various reasons.

The portions of the operation of this embodiment different from those of the fourth embodiment will now be described.

During the foregoing initial procedure, the MPU 111 detects clogging of a transference member, in the conveyance system formed from the paper-supply portion in the recording system to the paper discharge portion, the MPU 111 further detecting a failure state. If the transference-member clogging detection signal and/or the failure detection signal is detected by the MPU 111, a determination is performed that the recording operation cannot be performed, and the initial rotation is inhibited.

When the mode of apparatus is shifted from the low power consumption operation mode to the normal operation mode, the control device 44 for controlling the recording operation, which has been supplied with electric power, performs the operation according to the fourth embodiment for enabling the recording operation to be performed and an operation for detecting whether or not a cause of the impossibility of the recording operation detected by the MPU 111 exists.

To perform the foregoing operations, the control device 44 for controlling the recording operation reads the contents of the ROM, on which the various instructions for the recording operation have been written, when electric power is supplied to the control device 44 for controlling the recording operation. Moreover, the control device 44 for controlling the recording operation detects whether or not the initial-rotation inhibition signal has been transmitted from the MPU 111. If the control device 44 for controlling the recording operation has confirmed that the initial-rotation inhibition signal has been transmitted from the MPU 111, the control device 44 for controlling the recording operation does not perform the initial rotation but determines the state in accordance with the program routine for use at the time of supplying electric power.

Therefore, the recording motor M2 maintains the non-operating state.

As described above, according to the fifth embodiment, the initial rotation can be inhibited if an abnormal state has been detected. As a result, a wasteful operation, such that the initial rotation is performed though the recording operation cannot be performed, can be prevented.

As described above, according to the third embodiment, when image data for one page has been stored in the storage means, the low power consumption operation mode is switched to the normal operation mode. Therefore, excess consumption of electric power can effectively be prevented.

According to the second embodiment, when the low power consumption operation mode is switched to the normal operation mode, the initial rotation is inhibited. Therefore, the recording operation can immediately be performed when the apparatus has been restored from the state of waiting for the recording operation to the operation state.

Moreover, the initial rotation can be performed without exception when electric power is supplied to initialize predetermined sections and detect a failure.

In particular, determination can be performed whether the shift from the low power consumption operation mode to the normal operation mode is due to the activation of the power source of shift from the state of waiting for the recording operation. Thus, if a facsimile communication to be completed in a short time is performed, the recording operation can immediately be performed. Thus, a wasteful operation, such that the memory substitution receipt is performed through no failure takes place, can be prevented. Moreover, waste of time can be prevented such that an urgent facsimile communication is extracted from a memory.

Sixth Embodiment

The first embodiment has the structure such that the control device 44 for controlling the recording operation automatically performs the initial rotation when power supply is started.

However, a sixth embodiment has a structure such that the control device 44 for controlling the recording operation performs the initial rotation when the initial rotation execution signal has been supplied to the same from the MPU 111. When the switch SW 46 is switched on (when the MPU 111 starts operating), the MPU 111 transmits the initial-rotation execution signal.

Figure 6B:
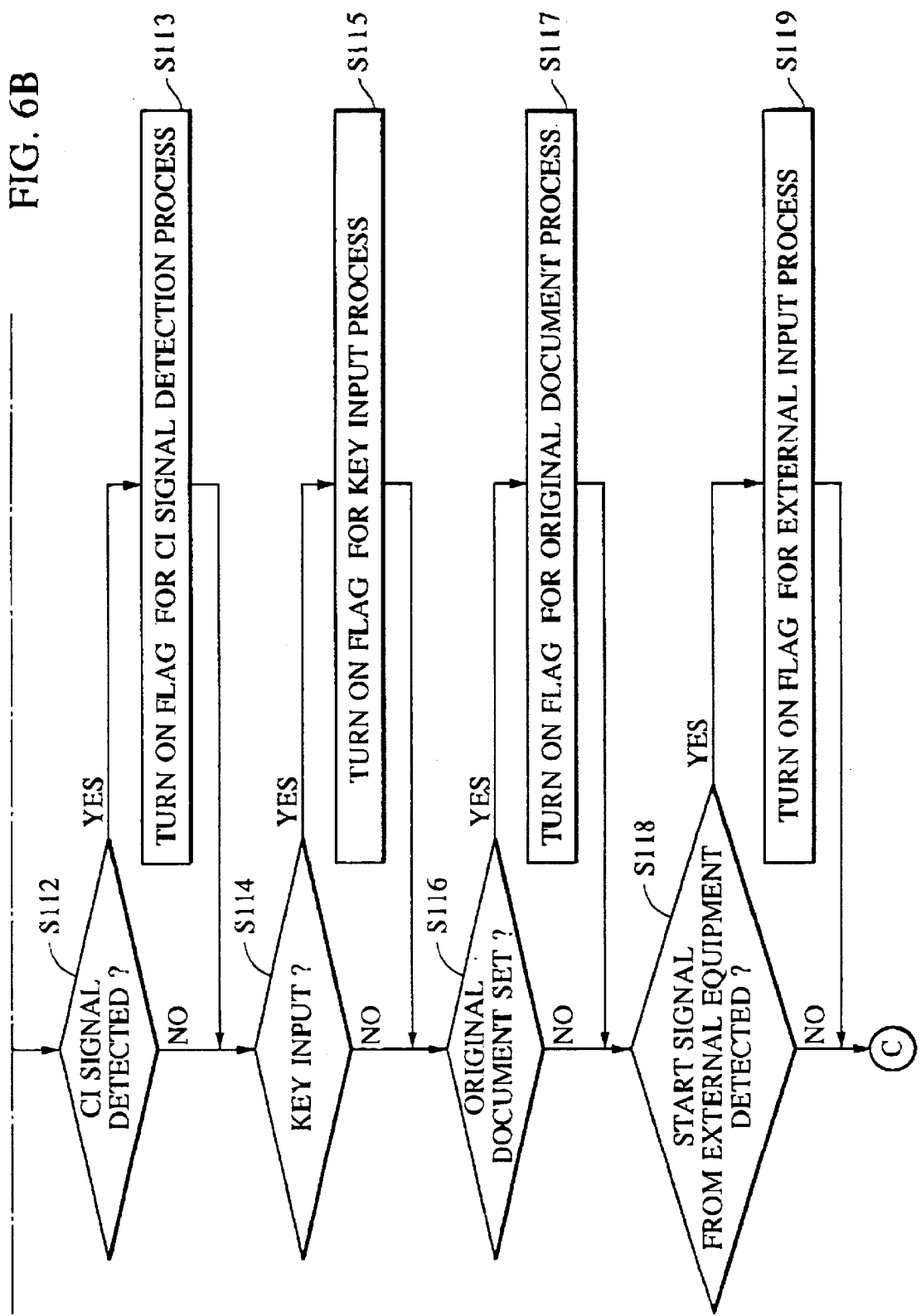
Figure 7B:
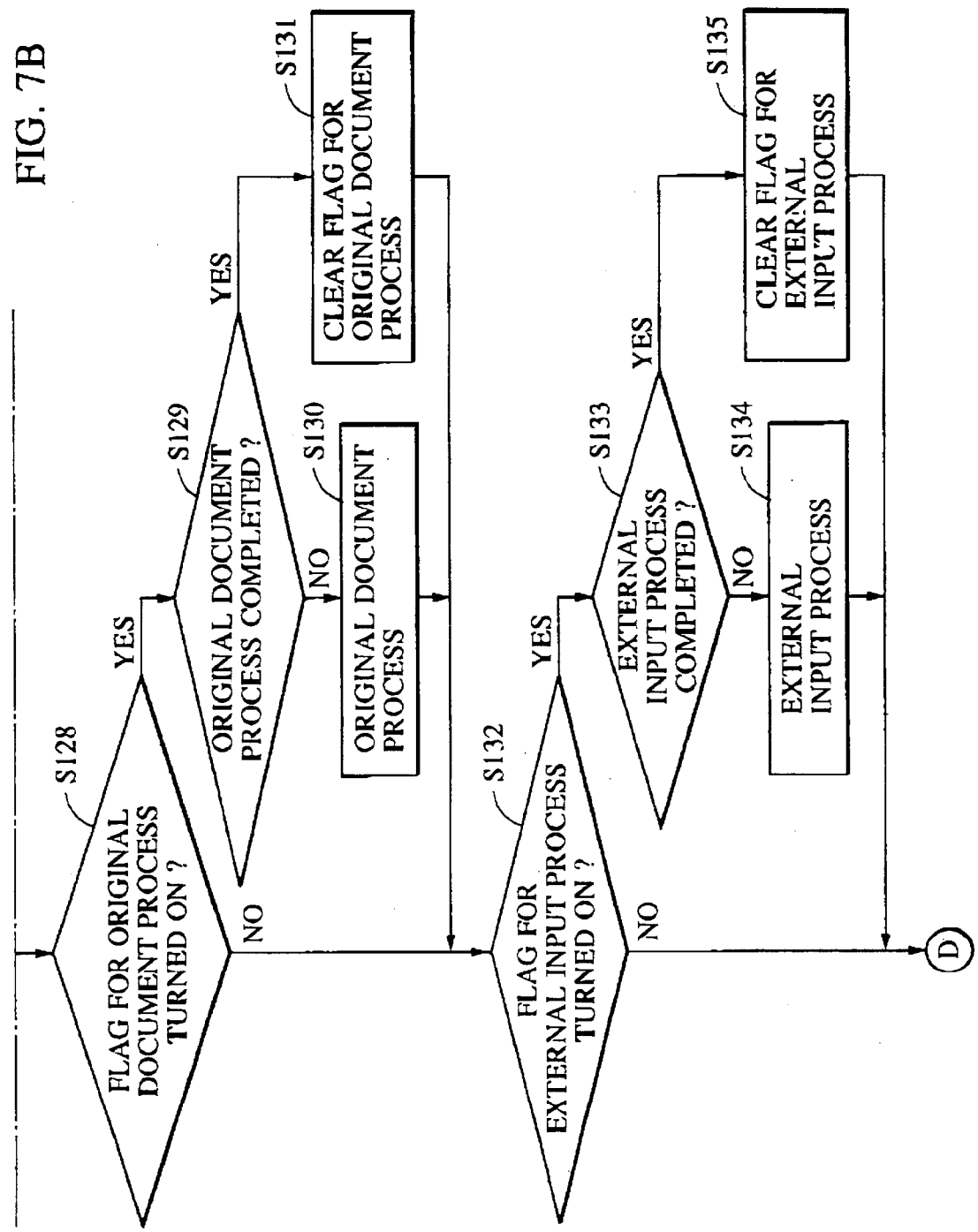
Figure 8A:
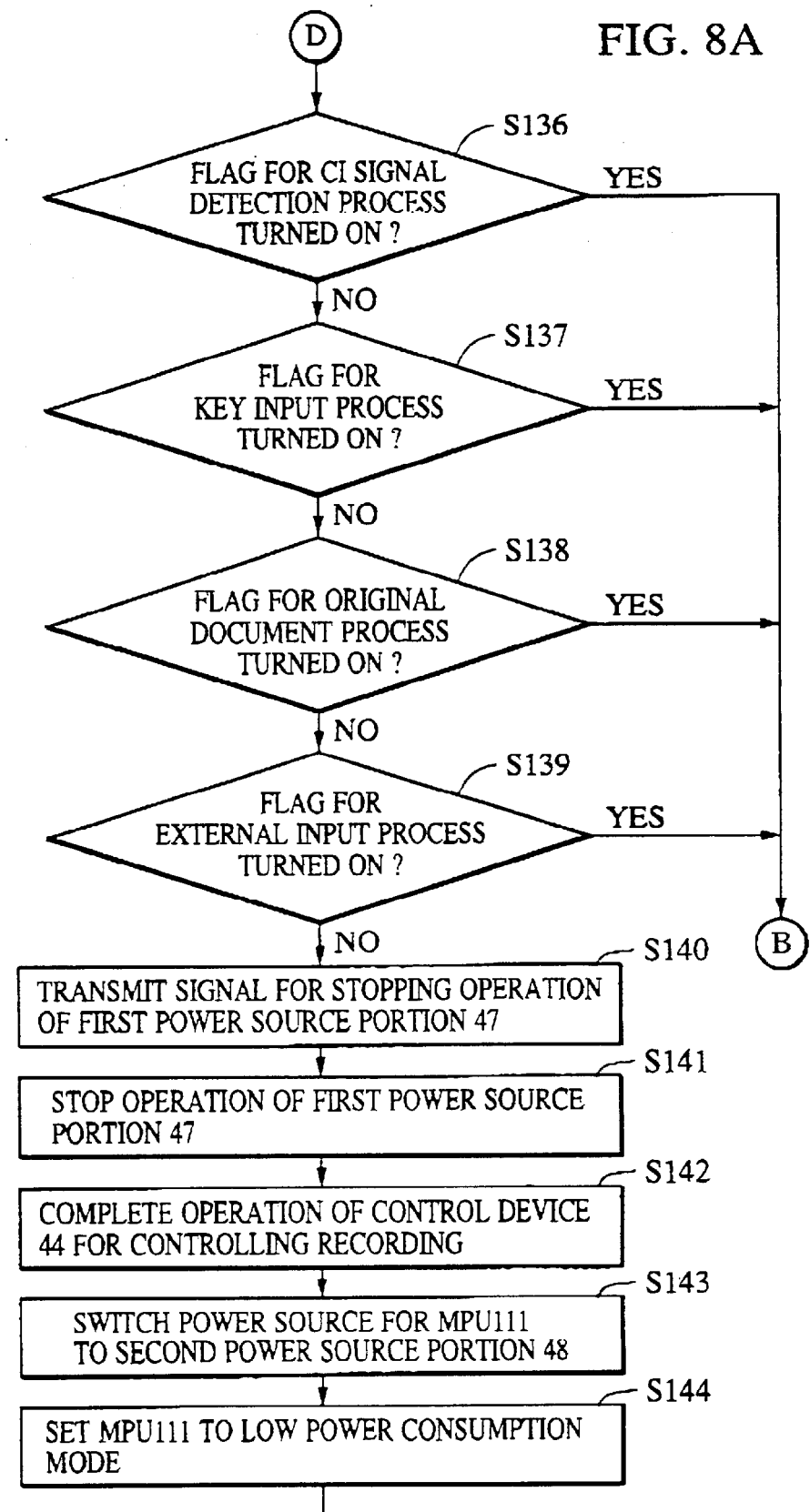
Figure 9:
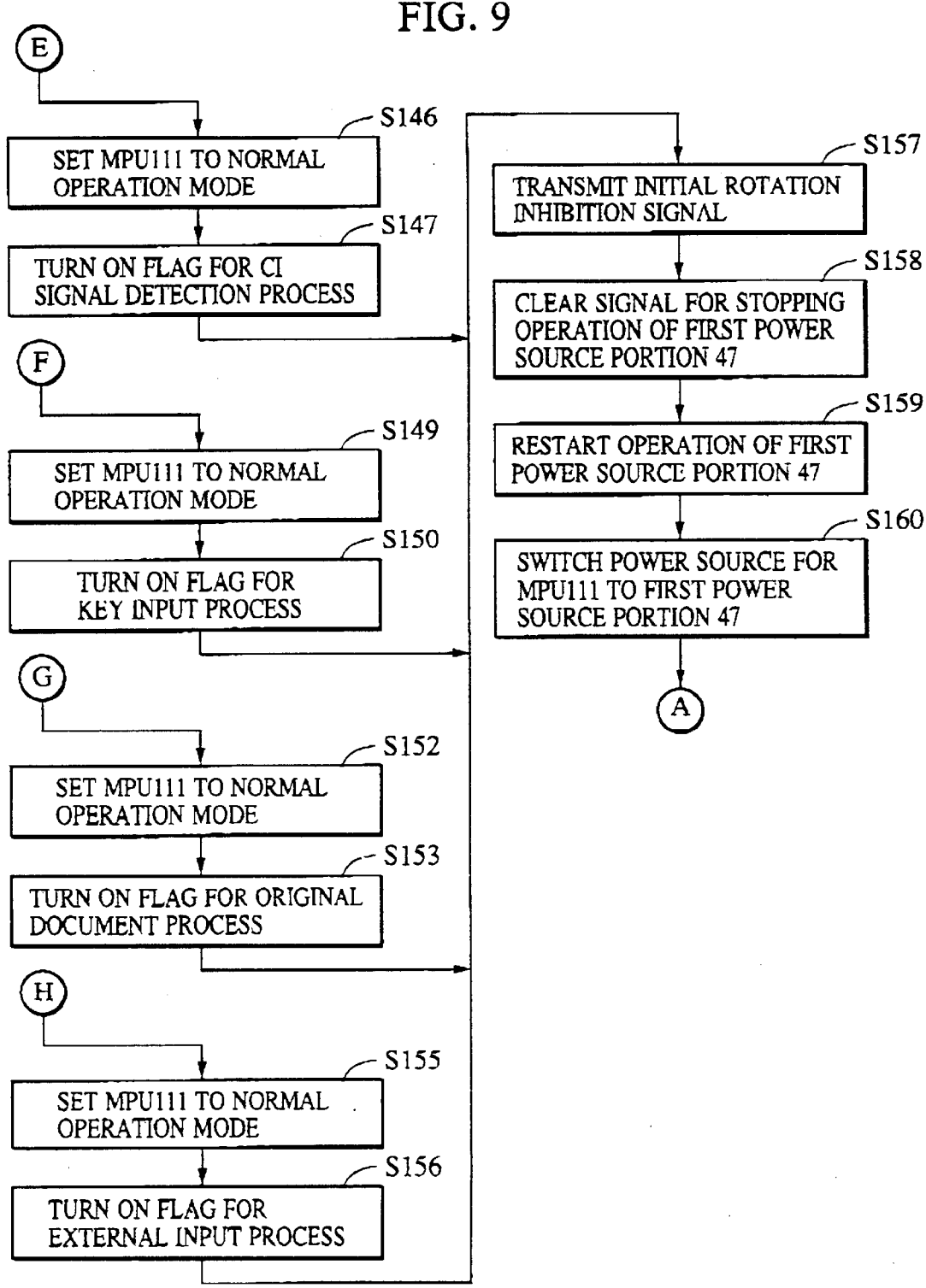
FIG. 9 is a flow chart of the operation of the facsimile apparatus shown in FIG. 1.

A flow chart of the operation of the sixth embodiment is shown in FIG. 19. Referring to FIG. 19, the same operations as those sown in FIG. 6 are given the same reference numerals and the are omitted from descriptions.

In step S601 the control device 44 for controlling the recording operation detects whether or not the initial-reaction execution signal has been transmitted from the MPU 111. If the initial-rotation execution signal has been detected, the operation proceeds to step S106. If the foregoing signal has not been detected, the operation proceeds to step S602. In step S602 the control device 44 for controlling the recording operation transmits, to the MPU 111, the initial rotation signal interruption command.

Figure 20:
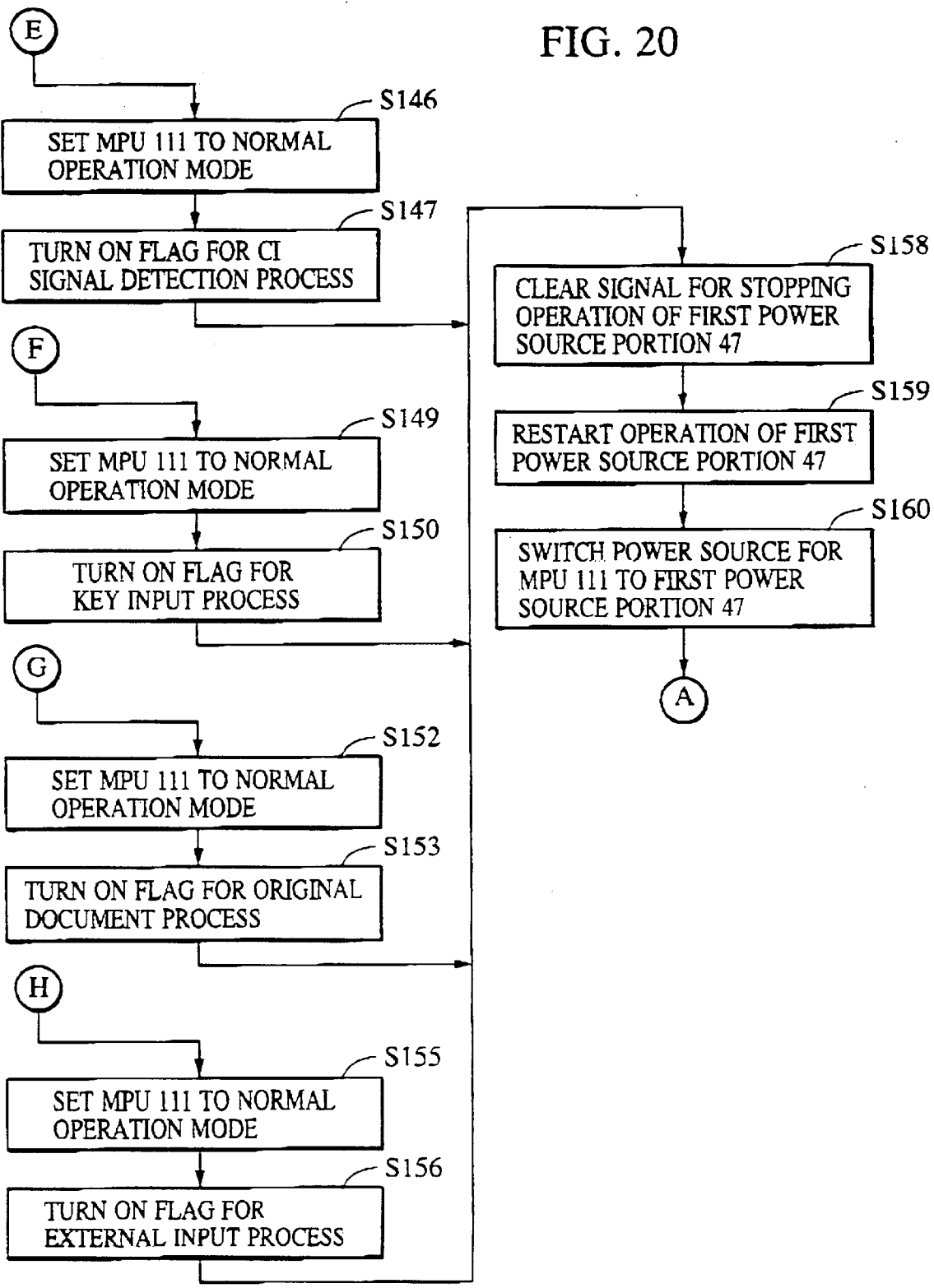
FIG. 20 is a flow chart of the operation of the sixth embodiment.

Referring to FIG. 20, the operation proceeds from steps S147, S150, S153 and S156 to step S158.

Seventh Embodiment

Figure 21:
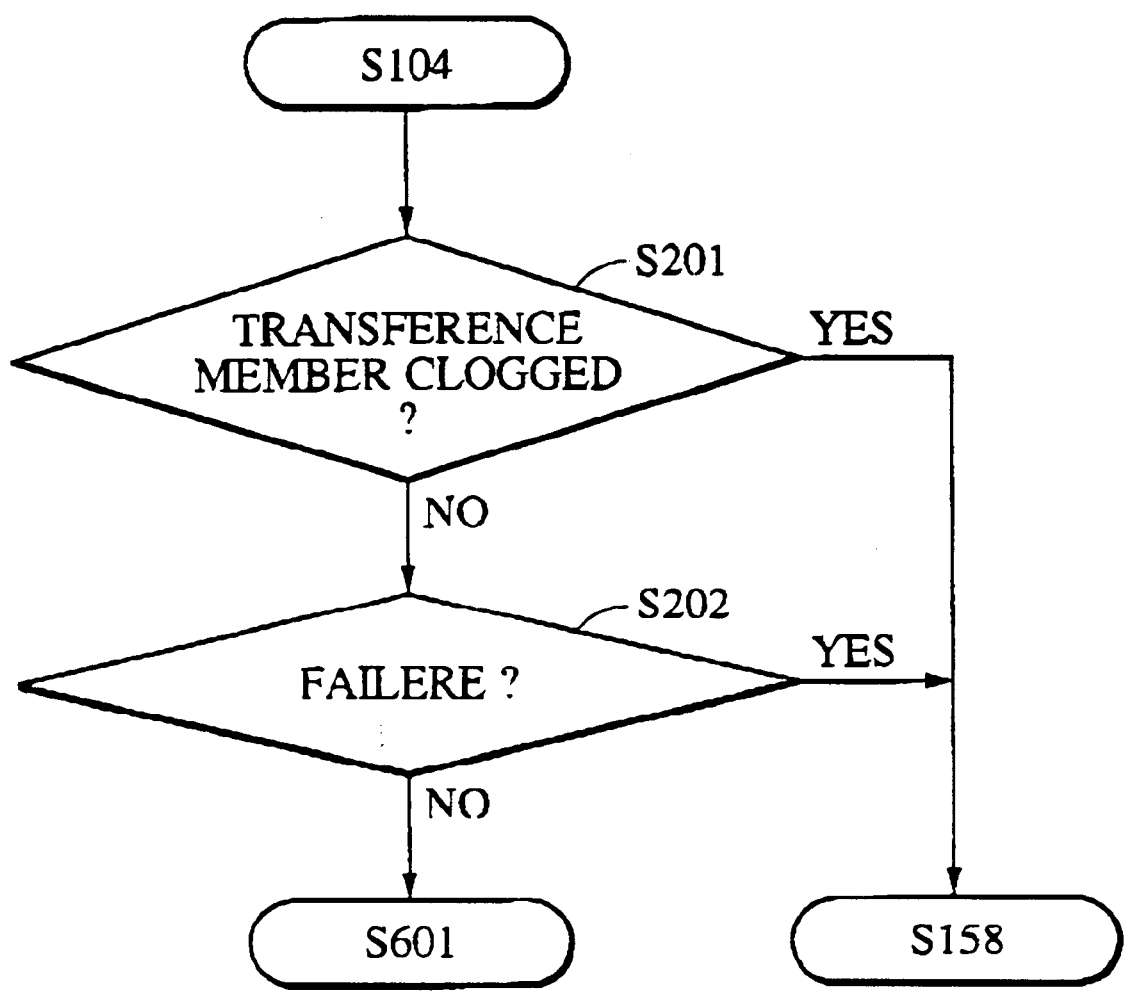
FIG. 21 is a flow chart of the operation of a seventh embodiment.

A flow of the operation of a seventh embodiment is shown in FIG. 21.

Referring to FIG. 21, the same elements as those shown in FIG. 11 are given the same reference numerals and they are omitted from descriptions. The process according to the seventh embodiment is the same as that according to the second embodiment.

If an affirmative determination is performed in step S202, the operation proceeds to step S158. If a negative determination is performed, the operation proceeds to step S601.

The structure of this embodiment may be as follows.

In step S101 shown in FIGS. 6A and 19A, which are flow charts of the operation of this embodiment, and in FIGS. 5, 12, 13, 14 and 18, which are block diagrams of this embodiment, the first power supply portion 47 is turned on/off by the switch 46. In place of using the switch 46, the first power supply portion 47 may be turned on/off by inserting/drawing a power supply cable 70 (not shown) into or from an inlet 71 (not shown) of the facsimile apparatus 1, the power supply cable 70 being used to connect the facsimile apparatus 1 to the AC power source 49.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An image forming apparatus comprising:

transference-member conveyance means for conveying a transference member to which an image, to be formed on a recording medium, is transferred;

operation means for operating said transference-member conveyance means; and control means which performs switching between a normal operation mode, in which said apparatus is operated with normal electric power, and a low power consumption operation mode, in which said apparatus is operated with electric power less than normal electric power;

generating means for generating a signal for inhibiting the operation of said transference-member conveyance means when said low power consumption operation mode is switched to said normal operation mode; and inhibition means for inhibiting the operation caused by said operation means in response to the signal generated by said generating means.

2. An image forming apparatus according to claim 1, further comprising:

power-source connection means for respectively connecting and disconnecting an electric power source to and from said apparatus, wherein said inhibition means inhibits the operation caused by said operation means in response to the signal generated by said generating means when said low power consumption operation mode is switched to said normal operation mode in a state where said power-source connection means is connected, said inhibition means allowing the operation caused by said operation means regardless of the signal generated by said generating means when said power-source connection means, having been disconnected, is reconnected.

3. An image forming apparatus according to claim 1, further comprising:

power-source connection means for respectively connecting and disconnecting an electric power source to and from said apparatus; and clogging-state detection means for detecting clogging of a transference member in said apparatus, wherein said control means includes second inhibition means for inhibiting the operation caused by said operation means if clogging of the transference member is detected by said clogging-state detection means when said power-source connection means, having been disconnected, is reconnected.

4. An image forming apparatus according to claim 1, further comprising:

power-source connection means for connecting and disconnecting an electric power source to and from said apparatus; and failure detection means for detecting a failure in said apparatus, wherein said control means includes third inhibition means for inhibiting the operation caused by said operation means if a failure is detected by said failure detection means when said pour-source connection means, having been disconnected, is reconnected.

5. An image forming apparatus comprising:

storage means for storing image data to be recorded;

recording control means for controlling an operation for recording an image;

electric-power control means for controlling electric power consumption by performing switching between a normal operation mode, in which electric power is supplied to said recording control means to operate said apparatus with normal electric power, and a low power consumption operation mode, in which electric power is not supplied to said recording control means, so as to operate said apparatus with electric power less than normal electric power, and wherein, when image data for one page has been stored in said storage means, operation is switched from said low power consumption operation mode to said normal operation mode;

transference-member conveyance means for conveying a transference member to which an image, to be formed on a recording medium, is transferred;

operation means for operating said transference-member conveyance means;

generating means for generating a signal for inhibiting the operation of said transference-member conveyance means when said low power consumption operation is switched to said normal operation mode; and inhibition means for inhibiting the operation caused by said operation means in response to the signal generated by said generating means.

6. An image forming apparatus according to claim 5, further comprising:

power-source connection means for respectively connecting and disconnecting an electric power source to and from said apparatus, wherein when said power-source connection means, having been disconnected, is reconnected, said electric-power control means switches said low power consumption operation mode to said normal operation mode, and then said electric-power control means is capable of shifting the mode to said low power consumption operation mode.

7. An image forming apparatus according to claim 6, wherein when said low power consumption operation mode is switched to said normal operation mode in a state where said power-source connection means is connected, the operation caused by said operation means is inhibited in response to the signal generated by said generating means, and when said power-source connection means, having been disconnected, is reconnected, the operation to be caused by said operation means is permitted regardless of the signal generated by said generating means.

8. An image forming apparatus according to claim 7, further comprising:

clogging-state detection means for detecting clogging of a transference member in said apparatus; and second inhibition means for inhibiting the operation caused by said operation means if clogging of the transference member is detected by said clogging-state detection means when said power-source connection means, having been disconnected, is reconnected.

9. An image forming apparatus according to claim 8, further comprising:

failure detection means for detecting a failure in said apparatus; and third inhibition means for inhibiting the operation caused by said operation means if a failure is detected by said failure detection means when said power-source connection means, having been disconnected, is reconnected.

10. A method for controlling an image forming apparatus including (1) transference-member conveyance means for conveying a transference member to which an image, to be formed on a recording medium, is transferred, (2) operating means for operating the transference-member conveyance means, and (3) control means which performs switching between a normal operation mode, in which the apparatus is operated with normal electric power, and a low power consumption operation mode, in which the apparatus is operated with electric power less than normal electric power, said image forming method comprising the steps of:

generating a signal for inhibiting the operation of the transference-member conveyance means when the low power consumption operation mode is switched to the normal operation mode; and inhibiting the operation caused by the operation means in response to the signal generated in said generating step.

11. A method according to claim 10, the image forming apparatus further including power-source connection means for respectively connecting and disconnecting an electric power source to and from the apparatus, where in said inhibiting step, (a) the operation caused by the operation means is inhibited in response to the signal generated in said generating step when the low power consumption operation mode is switched to the normal operation mode in a state where the power-source connection means is connected, and (b) the operation caused by the operation means is allowed regardless of the signal generated in said generating means, when the power-source connection means, having been disconnected, is reconnected.

12. A method according to claim 10, the image forming apparatus further including power-source connection means for respectively connecting and disconnecting an electric power source to and from the apparatus, said method further comprising the steps of:

detecting clogging of a transference member in the apparatus; and inhibiting the operation caused by the operation means if clogging of the transference member is detected in said clogging detection step, when the power-source connection means, having been disconnected, is reconnected.

13. A method according to claim 10, the image forming apparatus further including power-source connection means for respectively connecting and disconnecting an electric power source to and from the apparatus, said method further comprising the steps of:

detecting a failure in the apparatus; and inhibiting the operation caused by the operation means if a failure is detected in said failure detection step, when said power-source connection means, having been disconnected, is reconnected.

14. A method for controlling an image forming apparatus including (1) storage means for storing image data to be recorded, (2) recording control means for controlling an operation for recording an image, (3) electric-power control means for controlling electric power consumption by performing switching between a normal operation mode, in which electric power is supplied in the recording controlling step to operate the apparatus with normal electric power, and a low power consumption operation mode, in which electric power is not supplied to the recording control means, so as to operate the apparatus with electric power less than the normal electric power, and wherein, when image data for one page has been stored in the storage means, operation is switched from the low power consumption operation node to the normal operation mode, and (4) transference-member conveyance means for conveying a transference member to which an image, to be formed on a recording medium, is transferred, said method comprising the steps of:

operation the transference-member conveyance means;

generating a signal for inhibiting the operation of the transference-member conveyance means when the low power consumption operation is switched to the normal operation mode; and inhibiting the operation of the transference-member conveyance means in response to the signal generated in said generating step.

15. A method according to claim 14, the image forming apparatus further including power-source connection means for respectively connecting and disconnecting an electric power source to and from the apparatus, said method further comprising the steps of:

when the power-source connection means, having been disconnected, is reconnected, the electric-power control means switches the low power consumption operation mode to the normal operation mode, and then the electric-power control means is capable of shifting the mode to the low power consumption operation mode.

16. A method according to claim 15, wherein when the lower power consumption operation mode is switched to the normal operation mode in a state where the power-source connection means is connected, said operating step is in inhibited in response to the signal generated in said generating step, and when the power=source connection means, having been disconnected, is reconnected, the operation step is performed regardless of the signal generated in said generating step.

17. A method according to claim 15, said method further comprising the steps of:

detecting clogging of a transference member in the apparatus; and inhibiting said operating step if clogging of the transference ember is detected in said clogging detection step, when the power-source connection means, having been disconnected, is reconnected.

18. A method according to claim 15, said method further comprising the steps of:

detecting a failure in the apparatus; and inhibiting said operation step if a failure is detected in said failure detection step, when said power-source connection means, having been disconnected, is reconnected.

\* \* \* \* \*

UNITED STATES PATENT AND TRADEMARK OFFICE
CERTIFICATE OF CORRECTION

PATENT NO. : 5,917,610

DATED : June 29, 1999

INVENTOR(S) : YASUO KOMADA ET AL.

It is certified that error appears in the above-identified patent and that said Letters Patent is hereby corrected as shown below:

ON COVER PAGE AT [56], AGENT, ATTORNEY, OR FIRM

"Fitzpatrick Cella Harper & Scinto" should read --Fitzpatrick, Cella, Harper & Scinto--.

SHEET 14

FIGURE 10, "DOECUMENT" should read --DOCUMENT--.

COLUMN 4

Line 25, "emitting" should read --Emitting--.

COLUMN 10

Line 3, "instep S117," should read --in step S117,--.

COLUMN 23

Line 17, "pour-source" should read --power-source--.

COLUMN 25

Line 22, "node" should read --mode--;
   Line 27, "operation" should read --operating--.

UNITED STATES PATENT AND TRADEMARK OFFICE
CERTIFICATE OF CORRECTION

PATENT NO. : 5,917,610
DATED : June 29, 1999
INVENTOR(S) :
 YASUO KOMADA ET AL.

It is certified that error appears in the above-identified patent and that said Letters Patent is hereby corrected as shown below:

COLUMN 26

Line 11, "lower" should read --low--;
    Line 15, "in" (first occurrence) should be deleted;
    Line 16, "operation" should read --operating--;
    Line 17, "power=source" should read --power-source--.

Signed and Sealed this

First Day of February, 2000

Attest:

Q. TODD DICKINSON

*Attesting Officer*    *Acting Commissioner of Patents and Trademarks*